(12) United States Patent
Raghavan et al.

(10) Patent No.: US 11,206,071 B2
(45) Date of Patent: Dec. 21, 2021

(54) SYSTEM AND METHOD FOR SWITCHING BEAMFORMING MODES IN MILLIMETER WAVE SYSTEMS

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Junyi Li, Chester, NJ (US); Dai Lu, San Diego, CA (US); Joseph Patrick Burke, San Diego, CA (US); Wenjun Li, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/996,831

(22) Filed: Aug. 18, 2020

(65) Prior Publication Data

US 2021/0058128 A1    Feb. 25, 2021

Related U.S. Application Data

(60) Provisional application No. 62/889,410, filed on Aug. 20, 2019.

(51) Int. Cl.
*H04B 7/02* (2018.01)
*H04B 7/06* (2006.01)
(Continued)

(52) U.S. Cl.
CPC ......... *H04B 7/0639* (2013.01); *H04B 7/0486* (2013.01); *H04B 7/063* (2013.01);
(Continued)

(58) Field of Classification Search
CPC .... H04B 7/0639; H04B 7/0486; H04B 7/086; H04B 7/063; H04B 7/0857; H04B 7/0686
(Continued)

(56) References Cited

U.S. PATENT DOCUMENTS

| 2011/0122968 A1* | 5/2011 | Jongren | ............... H04B 7/0639 |
| | | | 375/296 |
| 2012/0140723 A1* | 6/2012 | Taoka | ............... H04L 25/03929 |
| | | | 370/329 |

(Continued)

FOREIGN PATENT DOCUMENTS

WO     2019050440 A1    3/2019

OTHER PUBLICATIONS

International Search Report and Written Opinion—PCT/US2020/047041—ISA/EPO—dated Oct. 7, 2020.

*Primary Examiner* — Don N Vo
(74) *Attorney, Agent, or Firm* — Arent Fox LLP

(57) ABSTRACT

A UE may be configured to communicate using one of analog beamforming or hybrid beamforming. The UE may receive a set of beamformed signals from a base station. The UE may determine a set of angular spread values associated with a set of clusters in a channel between the base station and the UE based on the set of beamformed signals received from the base station. The UE may transmit the set of angular spread values to the base station. The UE may receive, from the base station based on the set of angular spread values, a set of transmission ranks associated with at least one cluster of the set of clusters. The UE may communicate at least one data stream with the base station across the at least one cluster using the set of transmission ranks associated with the at least one cluster of the set of clusters.

30 Claims, 13 Drawing Sheets

(51) Int. Cl.
*H04B 7/0456* (2017.01)
*H04B 7/08* (2006.01)
(52) U.S. Cl.
CPC .......... *H04B 7/0686* (2013.01); *H04B 7/086* (2013.01); *H04B 7/0857* (2013.01)
(58) Field of Classification Search
USPC .......................................... 375/267
See application file for complete search history.

(56) References Cited

U.S. PATENT DOCUMENTS

| | | | |
|---|---|---|---|
| 2013/0064129 A1* | 3/2013 | Koivisto | H04B 7/065 370/252 |
| 2015/0016379 A1* | 1/2015 | Nam | H04B 7/0639 370/329 |
| 2016/0080052 A1 | 3/2016 | Li et al. | |
| 2017/0026158 A1* | 1/2017 | Burstrom | H04B 7/024 |
| 2019/0260459 A1* | 8/2019 | Jeon | H04B 7/0617 |

* cited by examiner

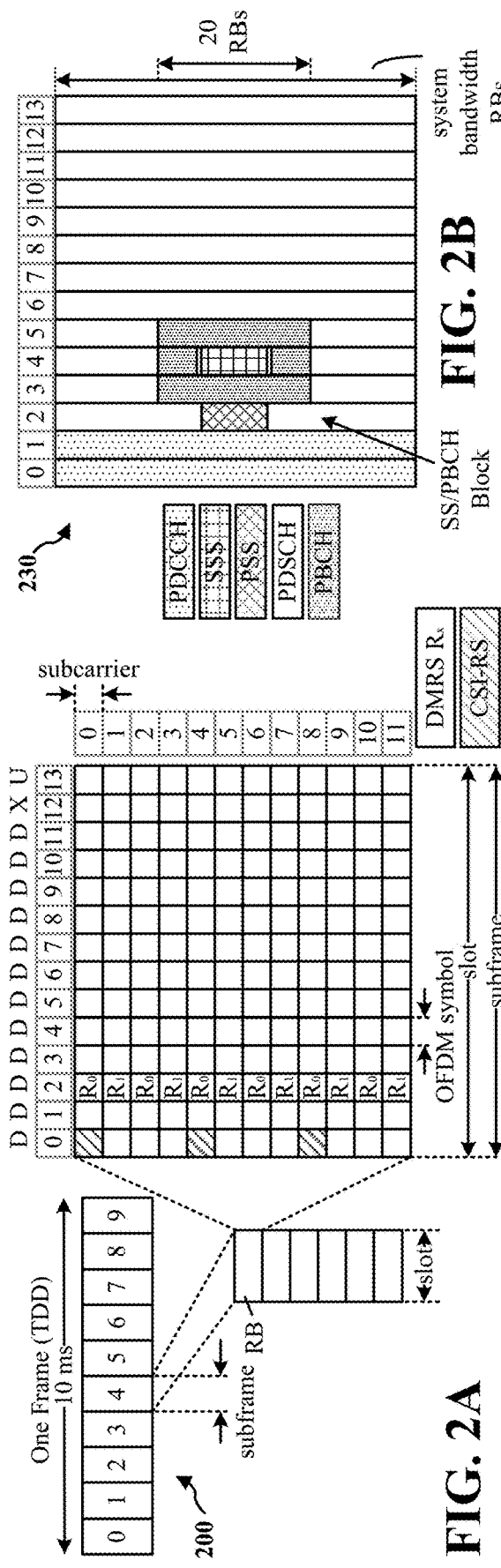
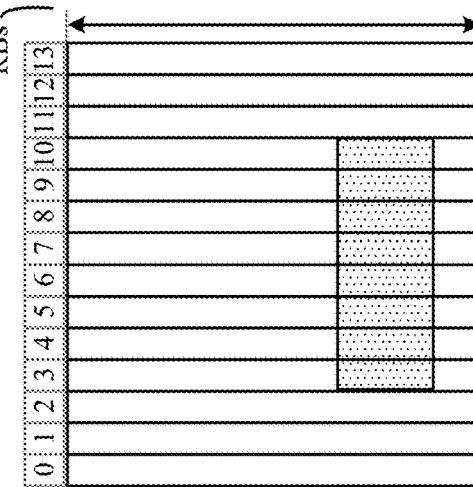
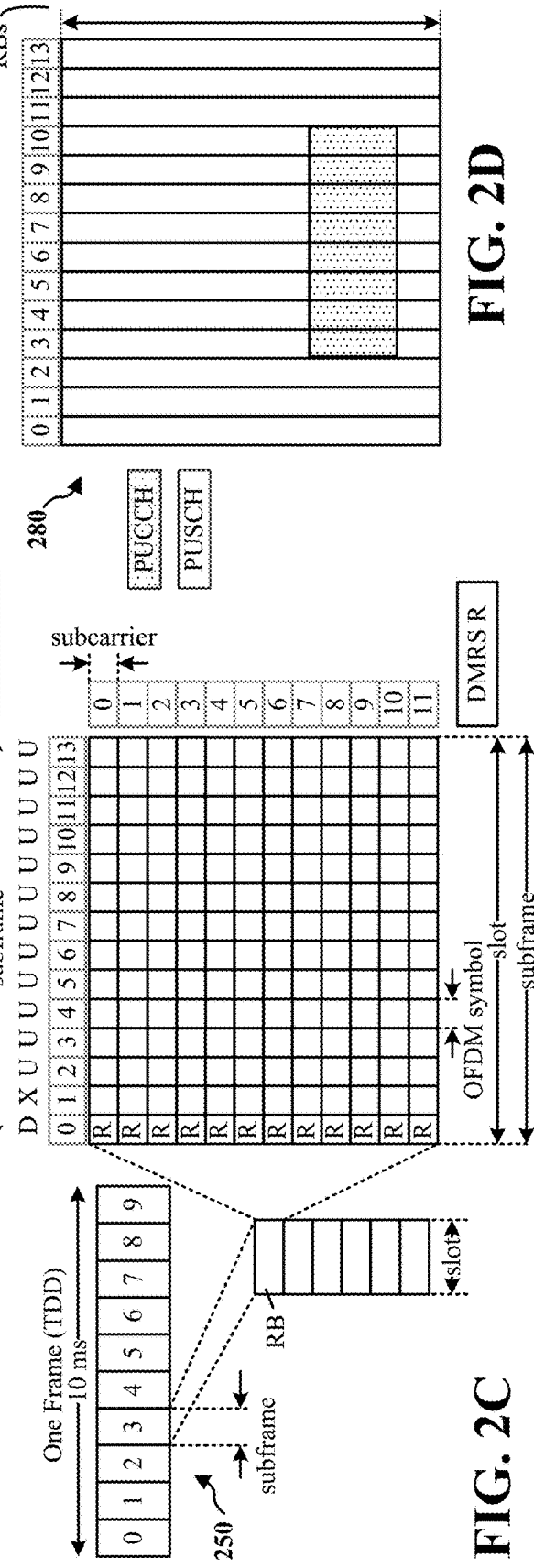
FIG. 2A  FIG. 2B  FIG. 2C  FIG. 2D

SYSTEM AND METHOD FOR SWITCHING BEAMFORMING MODES IN MILLIMETER WAVE SYSTEMS

CROSS REFERENCE TO RELATED APPLICATION(S)

This application claims the benefit of U.S. Provisional Application Ser. No. 62/889,410, entitled "SYSTEM AND METHOD FOR SWITCHING BEAMFORMING MODES IN MILLIMETER WAVE SYSTEMS" and filed on Aug. 20, 2019, the disclosure of which is expressly incorporated by reference herein in its entirety.

BACKGROUND

Technical Field

The present disclosure relates generally to communications systems, and more particularly, to a user equipment configured to switch between different hybrid beamforming modes for communication in a millimeter wave system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As radio access technologies continue have continued to evolve, demands for faster communication speeds and throughputs have likewise increased. One way to address such demands is communication in millimeter wave (mmW) (and near-mmW) frequency bands, such as Frequency Range (FR) 2 in 5G New Radio (NR) access networks. In order to achieve mmW communication, various systems and devices may utilize directional beamforming, e.g., in order to focus wireless signals in an access network rather than omni-directionally transmitting wireless signals in FR1 and/or sub-6 gigahertz (GHz) spectrums.

Some modem implementations for mmW and/or FR2 communication may include two radio frequency (RF) chains or layers, with polarization multiple-input multiple-output (MIMO) used over the RF chains or layers for scheduled downlink data, such as scheduled data on a physical downlink shared channel (PDSCH). Such modem implementations, then, may be configured for analog beamforming over two polarizations, which may support a single directional beam.

Due to various technological advancements, more complex modem implementations and beamforming configurations may be designed and applied. For example, some user equipments (UEs) may be capable of supporting two (or more) directional beams for simultaneous communication; that is, some UEs may support single-user MIMO with a spatial rank of two (or more). Furthermore, some UEs may be configured with more than two RF chains (e.g., four or eight RF chains, and potentially even more).

UEs configured with such advancements (e.g., single-user MIMO with spatial rank of two or more, four or more RF chains, and the like) may communicate using hybrid beamforming, e.g., over two or more independent data streams. Despite the fact that a UE may have the capability for hybrid beamforming with multiple beams, some scenarios may be better suited to analog beamforming with one directional beam or potentially even hybrid beamforming with one directional beam. Thus, a need exists for configuring a beamforming mode for a UE. The present disclosure describes various techniques and solutions to configuring a beamforming mode for UEs, which may be based on information provided by UEs and/or information related to specific communications, such as the communication environment.

In an aspect of the disclosure, a method, a computer-readable medium, and an apparatus are provided. The apparatus may be a base station. The base station may determine a set of angular spread values associated with a set of clusters in a channel between the base station and a UE. The base station may determine a set of transmission ranks associated with at least one cluster of the set of clusters based on the set of angular spread values. The base station may transmit the set of transmission ranks associated with the at least one cluster of the set of clusters to the UE. The base station may communicate at least one data stream with the UE across the at least one cluster using the set of transmission ranks associated with the at least one cluster of the set of clusters.

In another aspect of the disclosure, another method, another computer-readable medium, and another apparatus are provided. The other apparatus may a UE. The UE may receive a set of beamformed signals from a base station. The UE may determine a set of angular spread values associated with a set of clusters in a channel between the base station and the UE based on the set of beamformed signals received from the base station. The UE may transmit the set of angular spread values to the base station. The UE may receive, from the base station based on the set of angular spread values, a set of transmission ranks associated with at least one cluster of the set of clusters. The UE may communicate at least one data stream with the base station across the at least one cluster using the set of transmission ranks associated with the at least one cluster of the set of clusters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
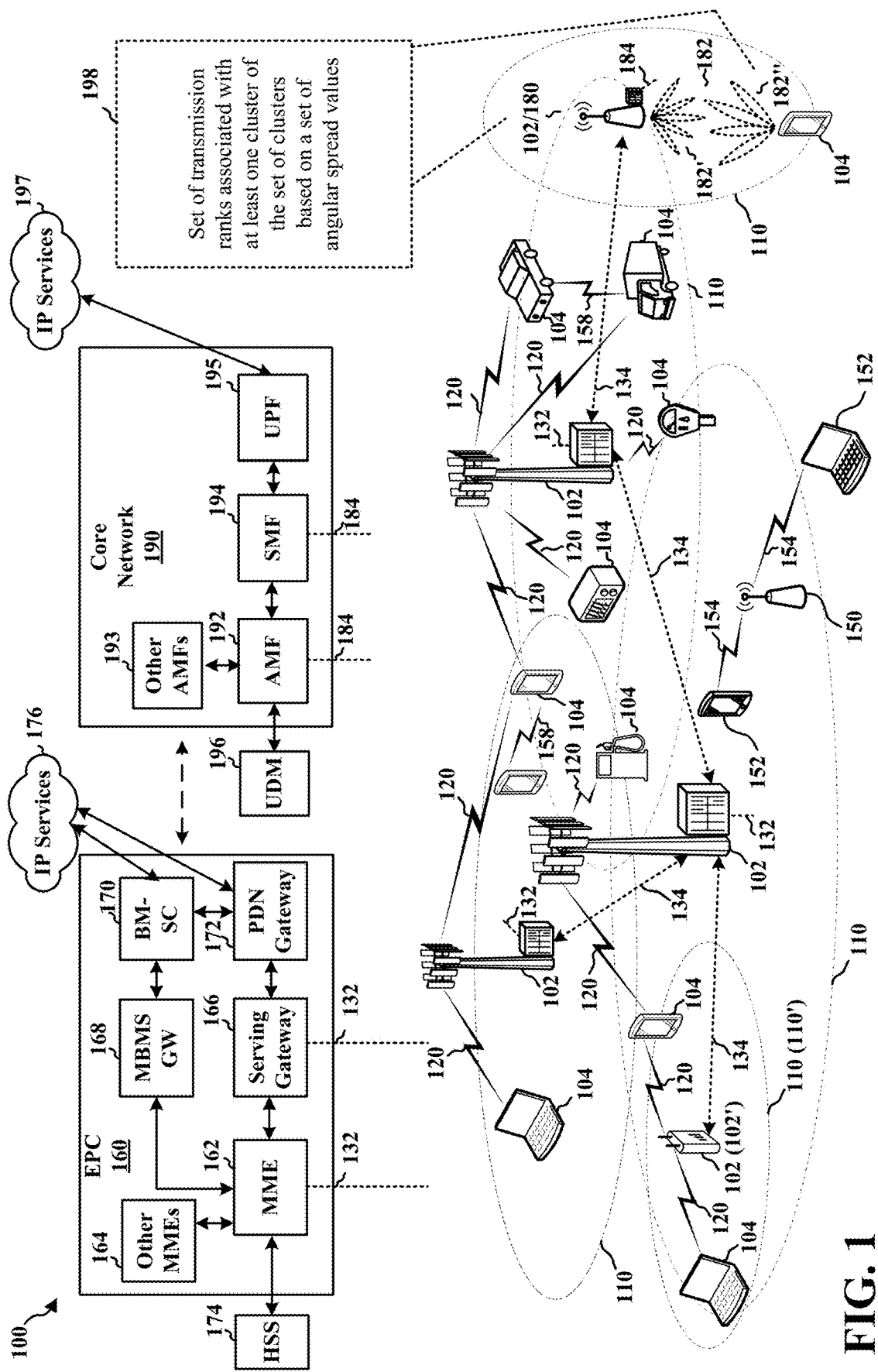
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may determine a set of angular spread values associated with a set of clusters in a channel between the base station 102/180 and a UE 104. The base station 102/180 may determine a set of transmission ranks 198 associated with at least one cluster of the set of clusters based on the set of angular spread values. The base station 102/180 may then transmit the set of transmission ranks 198 associated with the at least one cluster of the set of clusters to the UE 104. Subsequently, the base station 102/180 may communicate at least one data stream with the UE 104 across the at least one cluster using the set of transmission ranks 198 associated with the at least one cluster of the set of clusters.

Correspondingly, the UE 104 may receive the set of beamformed signals from the base station 102/180, and may determine a set of angular spread values associated with a set of clusters in the channel between the base station 102/180 and the UE 104 based on the set of beamformed signals received from the base station 102/180. The UE 104 may transmit the set of angular spread values to the base station 102/180, and may then receive, from the base station 102/180 based on the set of angular spread values, a set of transmission ranks 198 associated with at least one cluster of the set of clusters. Accordingly, the UE 104 may communicate at least one data stream with the base station 102/180 across the at least one cluster using the set of transmission ranks 198 associated with the at least one cluster of the set of clusters.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
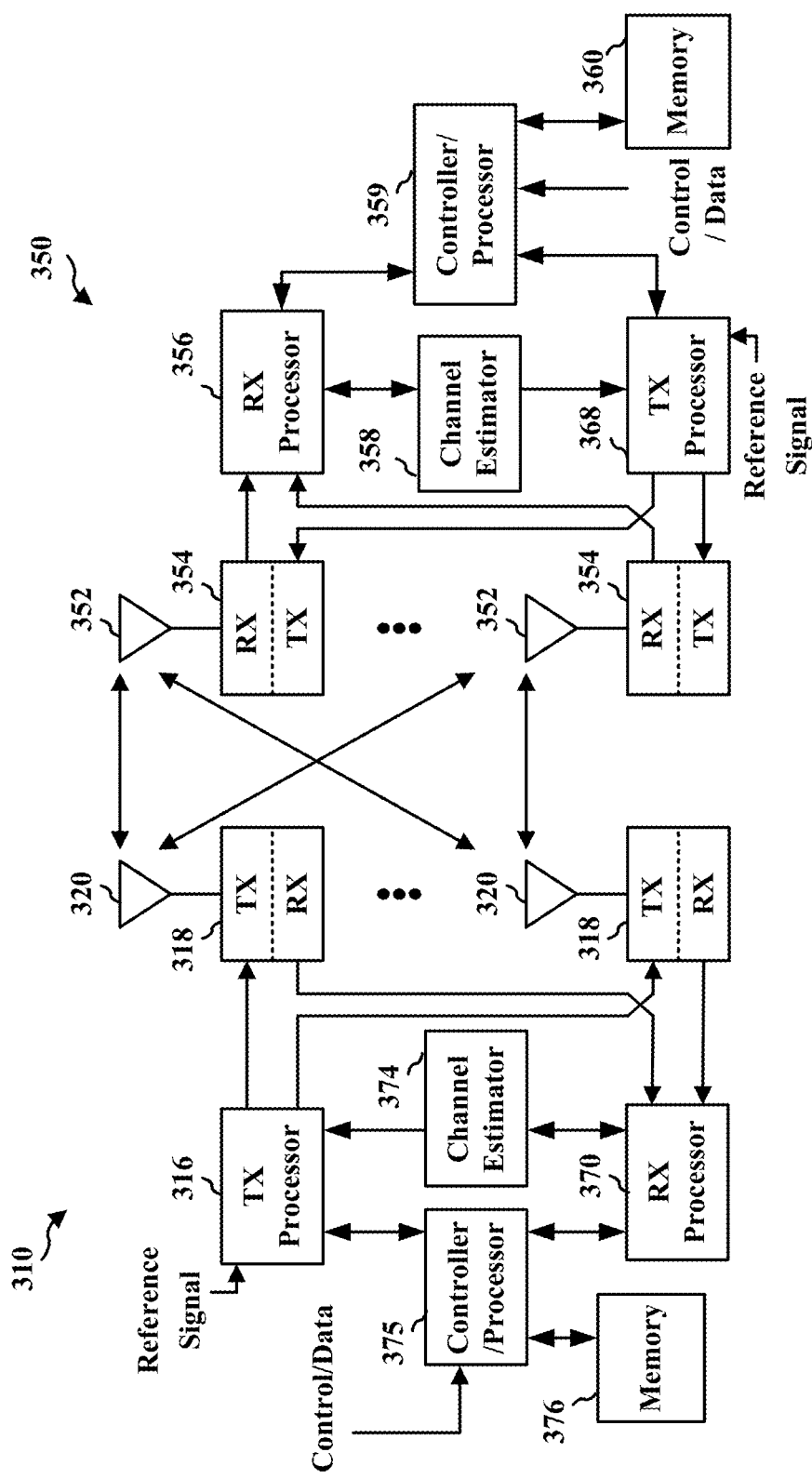
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In one aspect, at least one of the TX processor 368, the RX processor 356, and the controller/processor 359 may be configured to perform aspects in connection with 198 of FIG. 1.

In another aspect, at least one of the TX processor 316, the RX processor 370, and the controller/processor 375 may be configured to perform aspects in connection with 198 of FIG. 1.

Figure 4:
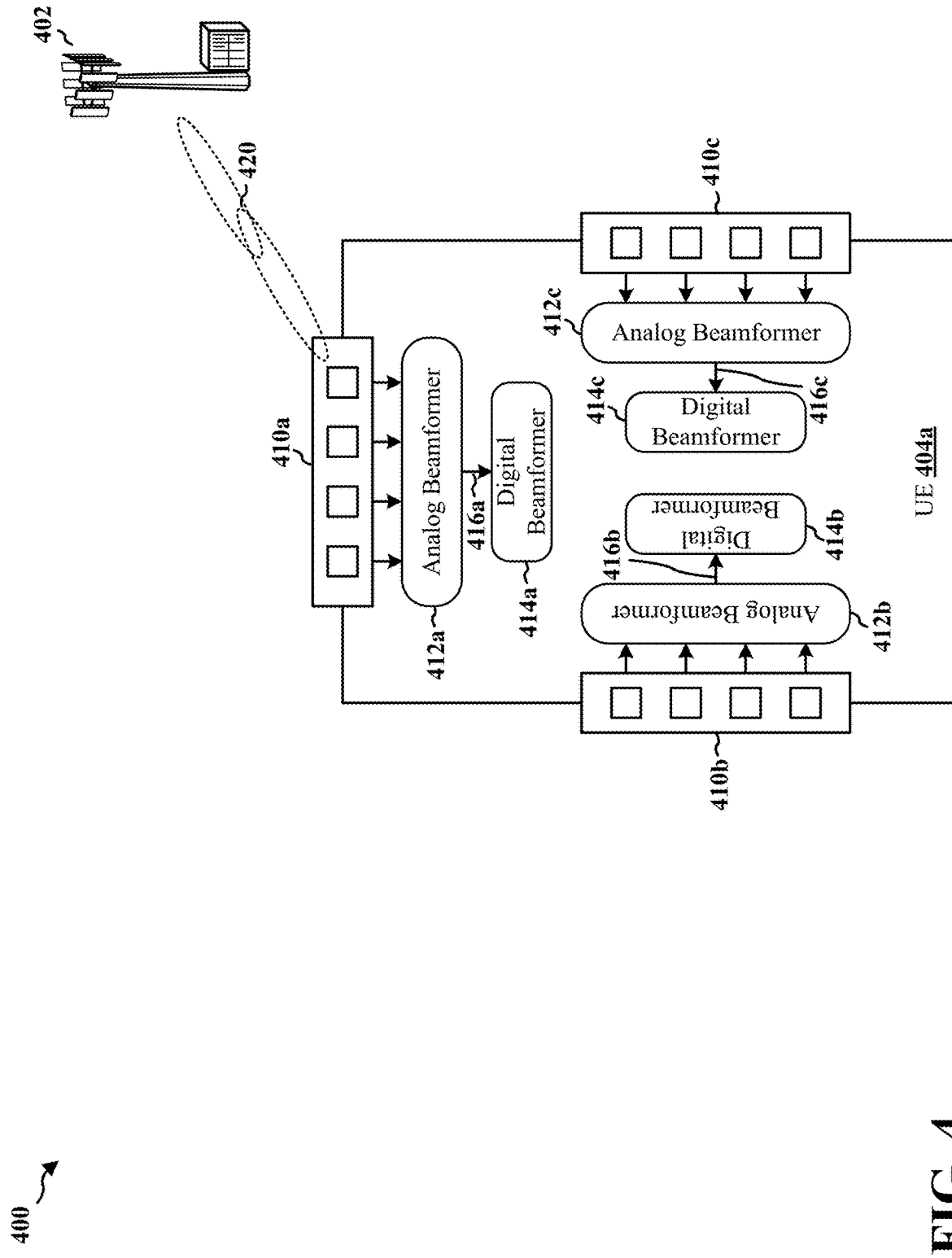
FIG. 4 is a block diagram of a wireless communications system.
Figure 5:
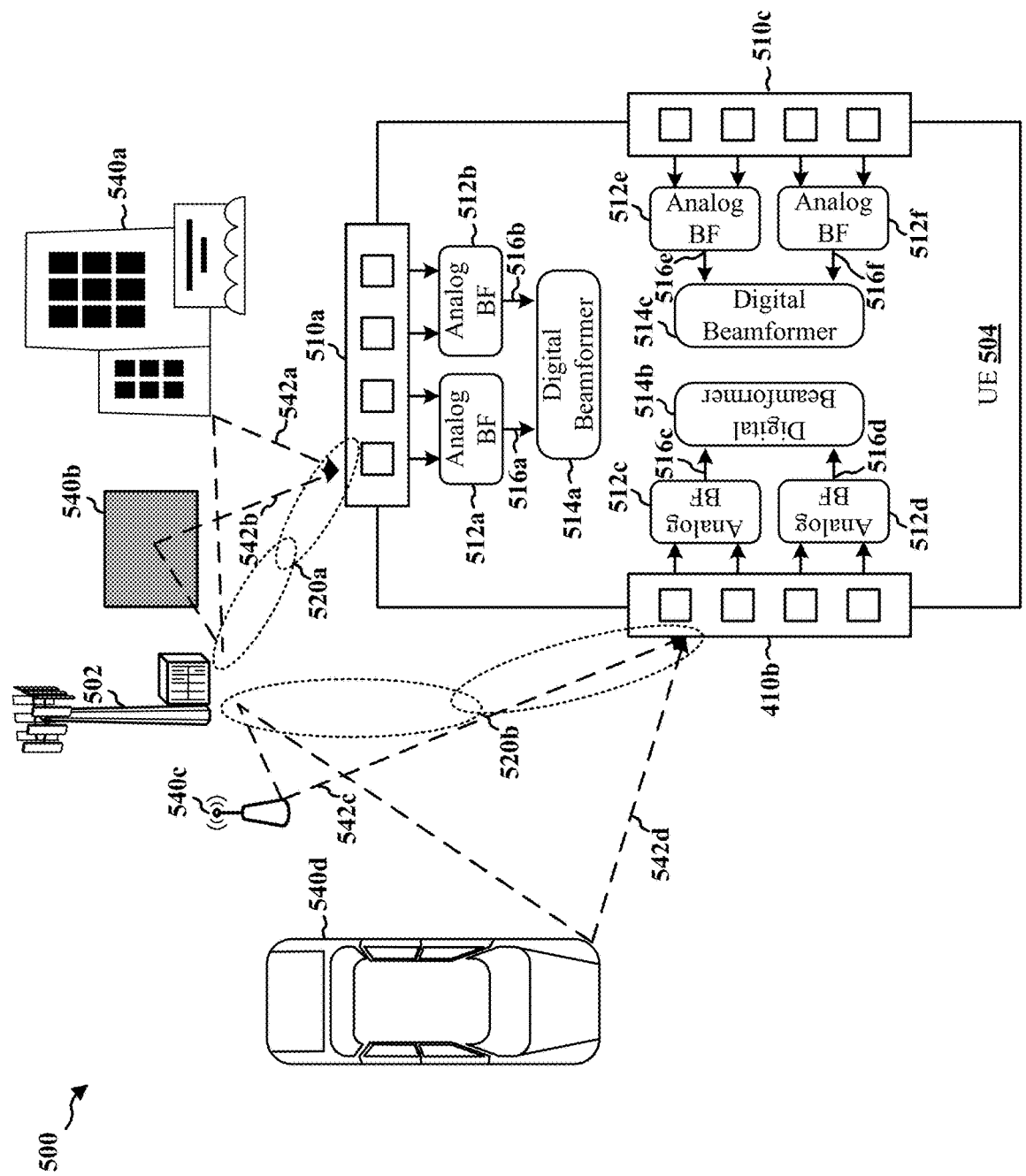
FIG. 5 is a block diagram of a wireless communications system.

FIGS. 4 and 5 are block diagrams illustrating wireless communications systems 400, 500, in accordance with various aspects of the present disclosure. In each of the wireless communications systems 400, 500, a respective one of the illustrated UEs 404, 504 may be configured to communicate in a mmWave and/or near-mmWave RAN. Each of the UEs 404, 504 may be implemented as, for example, the UE 104 of FIG. 1, the UE 350 of FIG. 3, and/or another UE described herein.

Each of the UEs 404, 504 may be configured to communicate in a mmWave and/or near mmWave network and, therefore, may be configured for beamforming. For example, each of the UEs 404, 504 may be configured to communicate in a 5G NR network and/or a Frequency Range 2 (FR2) network. Such mmWave and/or near-mmWave networks may occupy a frequency spectrum that begins at approximately 30 GHz, although the frequency spectrum may begin at 24 GHz in practice.

For communication in mmWave and/or near mmWave networks, each of the UEs 404, 504 may include a respective set of antenna modules 410a-c, 510a-c (also referred to as antenna panels). For example, each of the antenna modules 410a-c, 510a-c may be a dual-polarization patch antenna, and one or more of the antenna modules 410a-c, 510a-c may include dipoles distributed thereon. Other antenna structures may also be used within the antenna modules 410a-c, 510a-c, such as slotted waveguides, Yagi antennas, lens antennas, etc.

Each of the antenna modules 410a-c, 510a-c may include a respective set of antenna elements. Through a respective one of the antenna modules 410a-c, 510a-c each of the antenna elements may be communicatively coupled with one of the analog beamforming components 412a-c, 512a-f. The analog beamforming components 412a-c, 512a-f may be configured to control analog signals in the RF domain. For example, the analog beamforming components 412a-c, 512a-f may control the phases and amplitudes of analog signals that are transmitted or received.

Each of the analog beamforming components 412a-c, 512a-f may be communicatively coupled with one of the digital beamforming components 414a-c, 514a-c. Each of the digital beamforming components 414a-c, 514a-c may be configured to control signals either before conversion from digital to analog (when transmitting) or after conversion from analog to digital (when receiving). For example, each of the digital beamforming components 414a-c, 514a-c may be configured to control phases and/or amplitudes of signals per subcarrier (e.g., in the baseband) before conversion to an analog signal for transmission.

The communication path between each of the analog beamforming components 412a-c, 512a-f and a corresponding one of the digital beamforming components 414a-c, 514a-c may be referred to as an RF chain 416a-c, 516a-f. Each of the RF chains 416a-c, 516a-f may include one or more of an analog-to-digital converter (ADC), a digital-to-analog converter (DAC), a mixer, an upconverter, and/or a downconverter. Each of the RF chains 416a-c, 516a-f may support one independent data stream.

Each of the UEs 404, 504 may communicate with a respective one of the base stations 402, 502 via beamforming. For example, each of the UEs 404, 504 may perform beam training with a respective one of the base stations 402, 502 in order to identify a set of beam pairs having a satisfactory channel quality for uplink and/or downlink communication. A respective one of the base stations 402, 502 may control the set of beam pairs used for communication with one of the UEs 404, 504. The base stations 402, 502 may control a set of beam pairs for communication with one of the UEs 404, 504 based on information reported to a respective one of the base stations 402, 502 from one of the UEs 404, 504 (e.g., a set of reference signal received power (RSRP) values measured by one of the UEs 404, 504 corresponding to each of the beam pairs).

To configure one of the UEs 404, 504 with a set of beam pairs to use for communication with a respective one of the base stations 402, 502, each of the base stations 402, 502 may send information indicating a set of beam indices, each corresponding to one beam pair of the set of beam pairs, to a corresponding one of the UEs 404, 504. The set of beam indices may be indicated in DCI or also via MAC control element (CE) or RRC signaling, and each beam index of the set of beam indices may be indicated as a transmission configuration indication (TCI) state. In other words, each TCI state signaled by the UEs 404, 504 to the base station 402, 502 may correspond to a different beam index.

Referring first to FIG. 4, the UE 404 may be configured for an analog beamforming mode over one data stream. That is, the UE 404 may support one layer and, therefore, may only support a transmission rank of one. Accordingly, the UE 404 may support one data stream with the base station 402 at any time; although the UE 404 may support two polarizations of the one data stream for polarization MIMO.

The UE 404 may only support one data stream at a time because the UE 404 may only activate one RF chain 416a-c (supporting the one data stream) at a time. For example, the UE 404 may activate one of the RF chains 416a-c, which may cause a corresponding one of the analog beamforming components 412a-c to control a corresponding one of the antenna modules 410a-c. Because activating one of the RF chains 416a-c controls all the antenna elements of a corresponding one of the antenna modules 410a-c, the UE 404 may be unable to activate another one of the RF chains 416a-c (e.g., the other ones of the RF chains 416a-c may be deactivated).

In the analog beamforming mode, the UE 404 may perform frequency domain equalization of signals across one of the RF chains 416a-c. In some aspects, the analog beamforming components 412a-c of the UE 404 may apply a phase shifter and automatic/variable gain control at a corresponding one of the antenna modules 410a-c. Specifically, the analog beamforming components 412a-c may apply analog beamforming by controlling the signal phases and/or amplitudes at the RF (instead of the baseband). Further, the digital beamforming components 414a-c may refrain from applying digital beamforming (e.g., controlling signal phases and/or amplitudes in the baseband) when the UE 404 is operating in the analog beamforming mode.

As the UE 404 may support only one data stream, the UE 404 may only communicate through one beam pair 420 at any time with the base station 402 and, therefore, the UE 404 may only have one active TCI state at any time (e.g., a TCI state corresponding to a serving beam of the beam pair 420 generated by the base station 402). While the base station 402 may configure multiple TCI states for communication with the UE 404 (e.g., for transmissions on a data channel, such as a PDSCH or PUSCH), only one of the TCI states may be active at any one time (e.g., for scheduled transmissions on the data channel, such as the PDSCH or PUSCH). Thus, as illustrated, the beam pair 420 may correspond to only one beam generated by the base station 402.

Referring to FIG. 5, the UE 504 may be more complex than the UE 404. Specifically, the UE 504 may be configured to support a hybrid beamforming mode over more than one independent data streams. In other words, the UE 504 may support at least two layers and, therefore, may support a transmission rank of at least two. In addition, the UE 504 may support two polarizations for each of the two data streams.

The UE 504 may support up to two data streams at a time because the UE 504 may only activate two of the RF chains 516a-f (each supporting one data stream) at a time. For example, the UE 504 may activate two of the RF chains 516a-f, which may cause the corresponding two of the analog beamforming components 512a-f to control a corresponding subset of antenna elements (e.g., two) of the antenna modules 510a-c.

While the UE 504 is described herein as supporting two independent data streams and, therefore two layers with a transmission rank of two, the UE 504 may support more than two independent data streams in some other aspects. For example, the UE 504 may include four RF chains per antenna module 510a-c (e.g., one RF chain per antenna element of each of the antenna modules 510a-c) and, therefore, may include four analog beamforming components per antenna module. With four RF chains, the UE 504 may be configured to support four independent data streams (e.g., the UE 504 may support four layers).

As each of the antenna modules 510a-c may be communicatively coupled with two of the RF chains 516a-f and each of the RF chains 516a-f may control a subset of antenna elements, the UE 504 may activate two of the RF chains 516a-f to control a corresponding subset of antenna elements of an antenna module 510a-c. For example, two RF chains 516a-b of the first antenna module 510a may combine all of the antenna elements of the first antenna module 510a to generate a single beam, or may control a respective subset of the antenna elements of the first antenna module 510a to generate a respective beam so that two beams are generated.

The UE 504 may be configured for inter-module combining of antenna modules 510a-c. For inter-module combining, the UE 504 may activate two RF chains 516a-c that correspond to different antenna modules 510a-c. For example, the UE 504 may activate a first RF chain 516a corresponding to a subset of antenna elements of a first antenna module 510a and, in addition, may activate a third RF chain 516c corresponding to a subset of antenna elements of a second antenna module 510b.

As the UE 504 may support two independent data streams, the UE 504 may only communicate through two beam pairs 520a, 520b at any time with the base station 502. Accordingly, the UE 504 may have two active TCI states at any time. For example, the base station 502 may simultaneously configure two TCI states for a scheduled data channel (e.g., a PDSCH or a PUSCH) for the UE 504.

While the UE 504 may receive two independent data streams, the UE 504 may receive each of the independent data streams via two polarizations of one of the antenna modules 510*a-c*. For example, when a signal 542*b* from the base station 502 is reflected off a cluster 540*a-d* (e.g., a car, a window, a wall, a lamp post, a metallic object, etc.), the UE 504 may receive a data stream as one signal 542*a* through one polarization from the base station 502 directly via a beam pair 520*a-b*, and may also receive the data stream as another signal 542*b* through another polarization reflected by one of the clusters 540*a-d*. Similarly, the UE 504 may receive a second independent data stream through one signal 542*c* through one polarization from the base station 502 directly via a beam pair 520*a-b*, and may also receive the data stream as another signal 542*d* through another polarization reflected by one of the clusters 540*a-d*.

Because the UE 504 is configured to simultaneously activate at least two RF chains 516*a-f*, and therefore may be able to simultaneously communicate two independent data streams via two beam pairs, the base station 502 may determine a beamforming mode that is suitable for the UE 504. The first type of beamforming mode may be an analog beamforming mode, as described with respect to the UE 404 of FIG. 4. In the analog beamforming mode, the UE 504 may communicate via one beam pair at one time, which may correspond to a single active TCI state. The analog beamforming mode may allow for polarization MIMO.

In addition to the analog beamforming mode, the UE 504 may be configured to operate in the hybrid beamforming mode. For the hybrid beamforming mode, the digital beamforming components 514*a-c* corresponding to the active RF chains 516*a-f* may perform digital beamforming to control the digital signal in the baseband and, additionally, each of the analog beamforming components 512*a-f* may perform analog beamforming to control the analog signal in the RF. The analog beamforming mode may also be viewed as a degenerate or a special case of the possible hybrid beamforming modes.

In the hybrid beamforming mode, the UE 504 may support one TCI state in addition to supporting at least two TCI states at any one time. For example, the base station 502 may schedule transmissions for the UE 504 on a downlink data channel (e.g., PDSCH), and may transmit the scheduled transmissions via one beam or via two beams, depending on whether the base station 502 has configured the UE 504 with one TCI state or two TCI states for simultaneous transmission of the downlink data channel.

Thus, the UE 504 may be configured to switch between the analog beamforming mode with a single TCI state, the hybrid beamforming mode with a single TCI state, or the hybrid beamforming mode with at least two TCI states. However, the base station 502 may control the beamforming mode and TCI states for the UE 504. The base station 502 may rely on information about the UE 504 in order to such a determination for the UE 504. Accordingly, the UE 504 may be configured to transmit information associated with beamforming by the antenna modules 510*a-c* (including signal reception or transmission) to the base station 502, as described herein.

Figure 6:
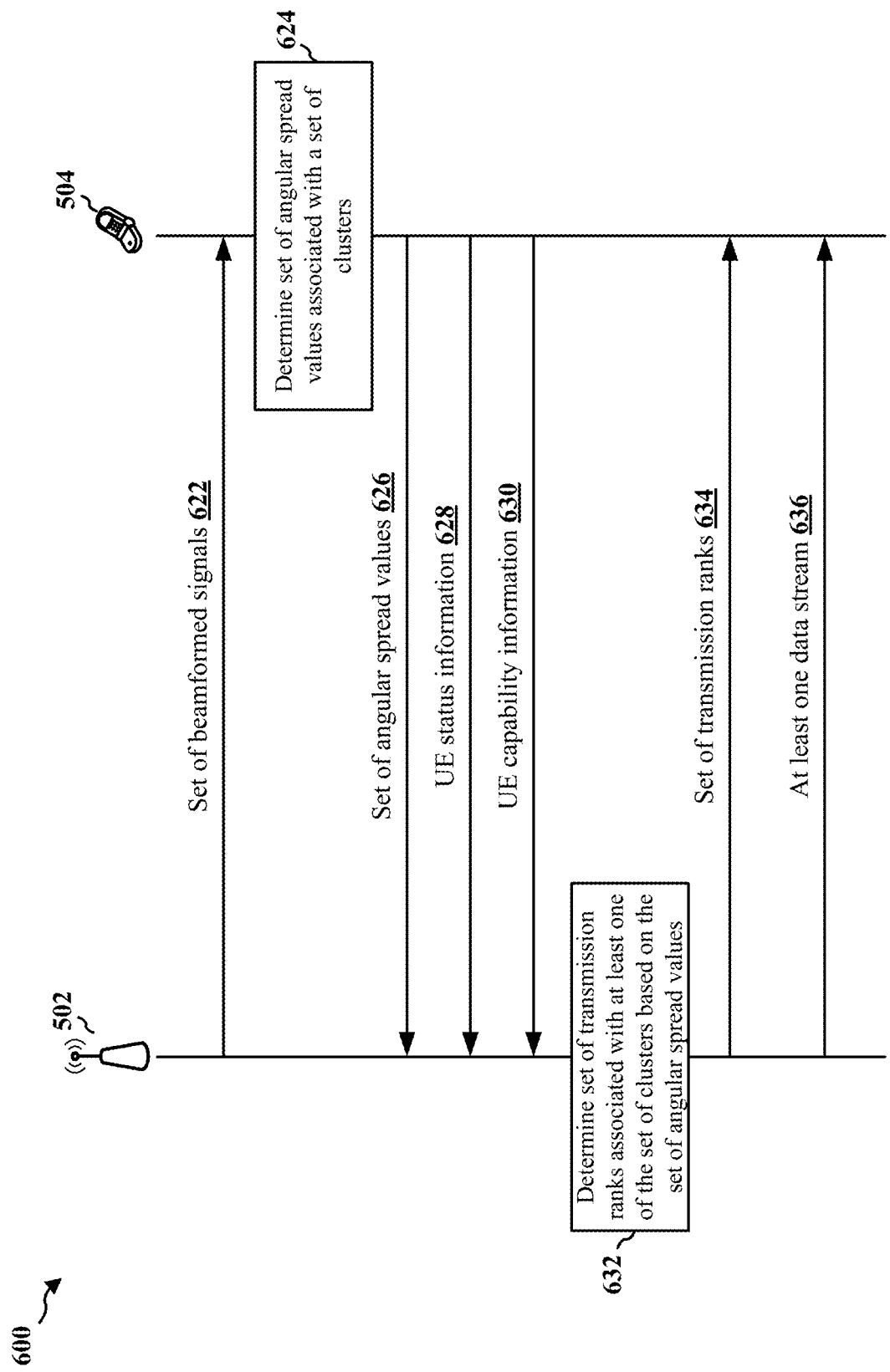
FIG. 6 is a call flow diagram of a wireless communications system.

Now with respect to FIG. 6, a call flow diagram illustrates communication in a wireless communications system 600. The wireless communications system 500 may include, inter alia, the base station 502 and the UE 504, which may be configured for a hybrid beamforming mode as described with respect to FIG. 5, supra.

The base station 502 may transmit a set of beamformed signals 622 to the UE 504. Each of the set of beamformed signals 622 may be a reference signal. When the UE 504 receives the set of beamformed signals 622, the UE 504 may receive signals via different polarizations of different antenna elements. For example, referring to FIG. 5, the UE 504 may receive one data stream as signals 542*a-b* reflected off two clusters 540*a-b*, and the UE 504 may receive another data stream as signals 542*c-d* reflected off two other clusters 540*c-d*.

The UE 504 may receive the one or more of the set of beamformed signals 622 from a cluster, which may reflect or relay the one or more of the set of beamformed signals 622 toward the UE 504. Examples of clusters include walls, cars, windows, buildings, or any surface that may reflect a signal toward the UE 504. In addition, examples of clusters may include relays or connection points, which may not reflect a signal but may amplify the signal toward the UE 504. The UE 504 may be unable to differentiate between different types of clusters, but may determine that different ones of the set of beamformed signals 622 are arriving at the UE 504 via different paths corresponding to the different clusters.

Based on the set of beamformed signals 622, the UE 504 may determine 624 a set of angular spread values, with each being associated with one cluster in a channel between the base station 502 and the UE 504. As the UE 504 may receive different signals of the set of beamformed signals 622 along different paths corresponding to different clusters, the UE 504 may determine that each of the paths along which signals are received corresponds to a different cluster. For example, the UE 504 may determine that each of the signals 542*a-d* is received along a different path corresponding to a different one of the clusters 540*a-d*. The UE 504 may then determine 624 each of the set of angular spread values associated with the clusters 540*a-d* in a channel between the base station 502 and the UE 504 based on the signals 542*a-d* received by the UE 504.

In one aspect, the UE 504 may determine 624 each of the set of angular spread values based on a respective signal strength associated with each of the set of beamformed signals 622 received from the base station 502. Examples of metrics for the signal strengths associated with each of the set of beamformed signals 622 may include a reference signal strength indicator (RSSI), an RSRP, a reference signal received quality (RSRQ), a signal-to-interference and noise ratio (SINR), and/or a signal-to-noise ratio (SNR). The UE 504 may include information indicating the signal strengths in the set of angular spread values 626. For example, the UE 504 may rank each of the cluster 540*a-d* according to the signal strengths measured for each of the set of beamformed signals 622 received by the UE 504 incident to each of the clusters 540*a-d*.

For example, according to each of the signal strengths determined by the UE 504 for each of the set of beamformed signals 622, the UE may determine 624 a respective of the set of angular spread values 626 based on a set of beam steering directions of a set of beams of the UE 504 via which a respective one of the signals 542*a-d* is received and, further, based on a set of beam widths of the set of beams via which the respective one of the signals 542*a-d* is received. The beam steering direction may be a direction of a beam generated by the UE 504 of one of the beam pairs 520*a-b* via which one of the set of beamformed signals 622 is received, and the beam width may be the spatial area covered by the beam. An illustrative (and not restrictive) example of beam width may include a spatial area corresponding to a 3 decibels (dB) or 5 dB crossover point from the peak of the beam pattern. When the UE 504 receives one of the set of beamformed signals 622 via at least two beams and the signal strengths measured for receiving the one of the set of beamformed signals 622 are within a threshold amount of one another, then the UE 504 may determine an angular spread value as the sum of the beam widths of the at least two beams via which the one of the set of beamformed signals 622 is received.

According to another aspect, the UE 504 may determine 624 each of the set of angular spread values 626 based on one of the set of beamformed signals 622 by performing a time-domain correlation of a delay spread associated with each of the set of beamformed signals 622. For example, the UE 504 may receive a subset of the set of beamformed signals 622, and the subset may include a first signal 542a associated with a first cluster 540a, as well as other beamformed signals associated with the first cluster 540a similar to the first signal 542a. The UE 504 may correlate, in the time domain, a delay spread of each of the subset of the set of beamformed signals 622, including the first signal 542a.

The UE 504 may determine 624 each of the set of angular spread values 626 for each of the clusters 540a-d based on each of the set of beamformed signals 622. For example, the UE 504 may determine a first angular spread value of the set of angular spread values 626 based on the subset of the set of beamformed signals 622 that includes the first beamformed signal 542a received incident from the first cluster 540a. Similarly, the UE 504 may determine a second angular spread value of the set of angular spread values 626 based on another subset of the set of beamformed signals 622 that includes the second beamformed signal 542b received incident from the second cluster 540b, and so forth.

The UE 504 may determine 624 the set of angular spread values 626 for each of the top K clusters. In one aspect, K may be preconfigured in the UE 504—e.g., K may be defined by a standard or technical specification promulgated by the Third Generation Partnership Project (3GPP). For example, K may be configured as four.

The UE 504 may determine that one of the clusters 540a-d is within the top K clusters based on the signal strengths of the signals 542a-d received by the UE 504 incident to one of the clusters 540a-d. For example, if the RSRPs of each of the signals received by the UE 504 incident to the first cluster 540a, including the first signal 542a, are higher than the RSRPs of other signals received by the UE 504 incident to the other clusters 540b-d, then the UE 504 may consider the first cluster 540a as the top cluster of the K clusters.

The UE 504 may transmit the set of angular spread values 626 to the base station 502. Alternatively, the UE 504 may transmit, to the base station 502, the set of angular spread values 626 weighted by the main direction at which the clusters 540a-d are seen from a reference coordinate system and the perspective of the UE 504. The base station 502 may receive the set of angular spread values 626, and may determine a set of transmission ranks associated with at least one of the top K clusters based on the set of angular spread values 626. The set of transmission ranks may be the layers via which a data stream may be transmitted to the UE 504. For example, two layers may be achieved through polarization, while another two layers may be achieved through digital beamforming of at least two beam pairs 520a-b.

However, the base station 502 may determine the set of transmission ranks based on additional information provided by the UE 504. In one aspect, the additional information may include information indicating a status of the UE 504. Thus, the UE 504 may transmit, to the base station 502, UE status information 628. The UE status information 628 may include one or more of a data rate requirement associated with the UE 504, a thermal status associated with the UE 504, and/or a power status associated with the UE 504.

The data rate requirement, for example, may be a peak data rate requested by the UE 504 (e.g., some services, such as streaming video and gaming, may need a relatively higher data rate than other services). The UE 504 may indicate the data rate in the UE status information 628 as a statistic associated with the data rate. For example, the UE 504 may indicate the data rate as a peak data rate per polarization layer, which may be equal to $\log_2(1+N \times P_{rx/antenna})$ for the analog beamforming mode using one TCI state at a time, or may be equal to $2 \log_2(1+N \times P_{rx/antenna}/2)$ for the hybrid beamforming mode with one or more TCI states, where $P_{rx/antenna}$ may be the per-antenna receive (rx) power at the UE 504 and N may be the number of antenna elements used by the UE 504 at one time for beamforming.

The thermal condition may indicate a temperature associated with the UE 504. For example, the thermal condition may indicate a skin temperature of the UE 504. The amount and complexity of computational processing, as well as the number of higher carrier frequency components activated, by the UE 504 may increase the skin temperature. The analog beamforming mode with one TCI state may not increase the skin temperature of the UE 504 as much as the hybrid beamforming mode with one or more TCI states.

The power status associated with the UE 504 may include the status of a battery of the UE 504, such as the amount of charge left on the battery or health of the battery. Similar to the thermal condition, the amount and complexity of computational processing, as well as the number of higher carrier frequency components activated, by the UE 504 may consume a greater amount of power (e.g., cause the battery of the UE 504 to drain quicker). The analog beamforming mode with one TCI state may not consume as much power of the UE 504 as the hybrid beamforming mode with one or more TCI states.

In addition to the UE status information 628, the base station 502 may determine the set of transmission ranks for the UE 504 based on the capabilities of the UE 504. The base station 502 may configure the UE 504 for one of the analog beamforming mode or the hybrid beamforming mode when the UE 504 is capable of operating in the hybrid beamforming mode. Therefore, the UE 504 may indicate, to the base station 502, whether the UE 504 is capable of operating in the hybrid beamforming mode. For example, the UE 504 may transmit UE capability information 630 to the base station 502 that indicates the hardware and/or signal processing capabilities of the UE 504. Examples of the UE capability information 630 include a number of RF chains associated with each antenna module 510a-c of the UE 504 that is available to support independent data streams and/or a number of RF chains associated with all of the antenna modules 510a-c of the UE 504.

The base station 502 may receive the UE status information 628 and the UE capability information 630 from the UE 504. In addition to the set of angular spread values 626, the base station 502 may determine 632 a set of transmission ranks associated with at least one of the set of clusters based on the UE status information 628 and the UE capability information 630. The set of transmission ranks may indicate the number of layers to be used for communication with the UE 504 and, further, whether those layers should be communicated to the UE 504 in the hybrid beamforming mode or in the analog beamforming mode.

According to various aspects, the base station 502 may determine 632 the set of transmission ranks by first determining whether to configure the UE 504 in the analog beamforming mode or the hybrid beamforming mode. The base station 502 may determine to configure the UE 504 for the analog beamforming mode when one or more of the set of the angular spread values 626 associated with one or more of the clusters 540a-d is relatively narrow (e.g., less than or equal to ten degrees or less than or equal to five degrees—although the foregoing examples are to be regarded as illustrative and not restrictive). However, the base station 502 may determine to configure the UE 504 for the hybrid beamforming mode when one or more of the set of the angular spread values 626 associated with one or more of the clusters 540a-d is relatively wide (e.g., larger than forty-five degrees or larger than thirty degrees—although the foregoing examples are to be regarded as illustrative and not restrictive).

In addition, the base station 502 may determine to configure the UE 504 for the analog beamforming mode when the peak data rate requirement indicated in the UE status information 628 is relatively lower. Conversely, the base station 502 may determine to configure the UE 504 for the hybrid beamforming mode when the peak data rate requirement indicated in the UE status information 628 is relatively higher.

Similarly, the base station 502 may determine to configure the UE 504 for the analog beamforming mode when the thermal condition indicated in the UE status information 628 needs to be relatively lower (e.g., the skin temperature of the UE 504 should be reduced from 110° C.). The base station 502 may determine to configure the UE 504 for the hybrid beamforming mode when the thermal condition indicated in the UE status information 628 can be increased (e.g., the skin temperature of the UE 504 is within a lower bound, such as less than 90° C.).

Also included in the UE status information 628 may be the power status of the UE 504 (e.g., remaining battery charge). The base station 502 may determine to configure the UE 504 for the analog beamforming mode when the power status indicated in the UE status information 628 needs to be relatively more conservative (e.g., the remaining charge of the battery of the UE 504 should be conserved). The base station 502 may determine to configure the UE 504 for the hybrid beamforming mode when the power status indicated in the UE status information 628 is relatively high (e.g., the UE 504 may have a nearly charged battery or the UE 504 may be in a charging state).

In some aspects, the base station 502 may determine whether to configure the UE 504 in one of the analog beamforming mode or the hybrid beamforming mode based on beam management overhead. As analog beamforming may only use one TCI state at a time, a greater number of TCI states may be managed for the UE 504 when the UE 504 is operating in the analog beamforming mode. However, a fewer number of TCI states may be managed for the UE 504 when the UE 504 is operating in the hybrid beamforming mode—for example, as the base station 502 and the UE 504 may simultaneously communicate via two beam pairs corresponding to two TCI states, other TCI states for other times (as used in the analog beamforming mode) may be unnecessary. Therefore, configuring the UE 504 in the hybrid beamforming mode may reduce the number of TCI states that is to be managed for the UE 504, which may reduce the signaling overhead commensurate with signaling more TCI states to the UE 504 for use at different times when operating in the analog beamforming mode.

With respect to the UE capability information 630, the base station 502 may determine to configure the UE 504 in the analog beamforming mode when the UE capability information 630 indicates the UE 504 only includes one RF chain 516a-f per antenna module 510a-c and/or if the number of RF chains 516a-f of the UE 504 is equal to the number of antenna modules 510a-c of the UE 504. Alternatively, the base station 502 may determine to configure the UE 504 in the hybrid beamforming mode when the UE capability information 630 indicates the UE 504 includes more than one RF chain 516a-f per antenna module 510a-c and/or if the number of RF chains 516a-f of the UE 504 is greater than the number of antenna modules 510a-c of the UE 504.

In various aspects, the base station 502 may determine 632 the set of transmission ranks for the UE 504 based on weighting one or more of the aforementioned set of angular spread values 626, UE status information 628, and/or UE capability information 630. For example, assuming the UE capability information 630 indicates the UE 504 is capable of operating in the hybrid beamforming mode, the base station 502 may weigh the set of angular spread values 626 greater than the power status and/or beam management overhead associated with the UE 504 when determining the set of transmission ranks for the UE 504.

When the base station 502 determines 632 the set of transmission ranks, the base station 502 may determine one or more of the clusters 540a-d over which each layer is to be transmitted to the UE 504. In some aspects, the base station 502 may determine the "top" or "best" cluster for the set of transmission ranks based on which subset of the set of beamformed signals 622 has a highest measured signal strength when that subset of the set of beamformed signals 622 is received over one of the clusters 540a-d. For example, the base station 502 may determine that the first cluster 540a is the top cluster when the UE 504 indicates that the signal strength of the signal 542a is greater than the signal strengths of the other signals 542b-d received over the other clusters 540b-d. Similarly, the base station may determine that the second cluster 540b is the second best cluster over which to transmit a data stream to the UE 504 when the UE 504 indicates that the signal strength of the second signal 542b is greater than the signal strengths of the other signals 542c-d received over the other clusters 540c-d.

The base station 502 may determine 632 the set of transmission ranks associated with at least one of the set of clusters by determining whether to configure the UE 504 in the analog beamforming mode or the hybrid beamforming mode. When the base station 502 determines to configure the UE 504 in the analog beamforming mode, then the base station 502 may determine that the set of transmission ranks includes a transmission rank of one, which is associated with one of the set of clusters 540a-d (e.g., the UE 504 may receive a data stream over the top or best one of the set of clusters 540a-d).

Alternatively, when the base station 502 determines to configure the UE 504 in the hybrid beamforming mode, then the base station 502 may determine that the set of transmission ranks includes a transmission rank of one or a transmission rank higher than one (e.g., two) and, additionally, whether the set of transmission ranks is over one of the set of clusters 540a-d (e.g., two independent data streams transmitted to the UE 504 incident to one of the set of clusters 540a-d or over more than one of the set of clusters (e.g., one independent data stream over the best one of the set of clusters 540a-d and another independent data stream over the second best one of the set of clusters 540a-d).

The base station 502 may then transmit the set of transmission ranks 634 to the UE 504. The set of transmission ranks 634 may indicate which of the clusters 540a-d at least one data stream is to be received over. For example, when the base station 502 configures the UE 504 in the analog beamforming mode, the base station 502 may configure the set of transmission ranks 634 to indicate a transmission rank of one (one layer), which may indicate one data stream that is to be transmitted over one of the clusters 540a-d (e.g., the one layer may include two polarizations of a data stream).

Alternatively, when the base station 502 configures the UE 504 in the hybrid beamforming mode, the base station 502 may configure the set of transmission ranks 634 to indicate a transmission rank of greater than one (e.g., at least two layers) over one cluster or over more than one (e.g., two) clusters. For example, the base station 502 may configure the set of transmission ranks to indicate a transmission rank of two over one of the clusters 540a-d or may configure the set of transmission ranks to indicate a first transmission rank of one over one of the clusters 540a-d and a second transmission rank of one over another one of the clusters 540a-d.

The UE 504 may receive the set of transmission ranks 634, and may configure the UE 504 to operate in the analog beamforming mode or the hybrid beamforming mode based on the received set of transmission ranks 634. Further, the UE 504 may select at least one beam pair corresponding to at least one of the clusters 540a-d that is associated with the set of transmission ranks 634.

Illustratively, when the UE 504 is configured in the analog beamforming mode, the set of transmission ranks 634 may indicate a transmission rank of one associated with the first cluster 540a. Accordingly, the UE 504 may select a beam pair 520a corresponding to the first cluster 540a (e.g., the beam pair 520a via which the first signal 542a is received). The UE 504 may select the beam pair 520a based on a TCI state configured by the base station 502, which may be transmitted to the UE 504 in DCI or MAC-CE or RRC signaling in association with the set of transmission ranks 634.

According to another example, when the UE 504 is configured in the hybrid beamforming mode, the set of transmission ranks 634 may indicate a transmission rank of two associated with the first cluster 540a. Accordingly, the UE 504 may select a beam pair 520a corresponding to the first cluster 540a (e.g., the beam pair 520a via which the first signal 542a is received). The UE 504 may select the beam pair 520a based on a TCI state configured by the base station 502, which may be transmitted to the UE 504 in DCI in association with the set of transmission ranks 634.

Alternatively, when the UE 504 is configured in the hybrid beamforming mode, the set of transmission ranks 634 may indicate a first transmission rank of one associated with the first cluster 540a and a second transmission rank of one associated with the third cluster 540c (e.g., when the signal strength of the signal 542c received over the third cluster 540c is greater than the signal strengths of the signals 542b, 542d received over the other clusters 540b, 540d). Accordingly, the UE 504 may select a first beam pair 520a corresponding to the first cluster 540a (e.g., the beam pair 520a via which the first signal 542a is received), and may select a second beam pair 520b corresponding to the third cluster 540c (e.g., the beam pair 520b via which the third signal 542c is received). The UE 504 may select the beam pairs 520a-b based on TCI states configured by the base station 502, which may be transmitted to the UE 504 in DCI in association with the set of transmission ranks 634.

Once the UE 504 is configured with the set of transmission ranks 634 associated with at least one of the clusters 540a-d, the base station 502 may transmit at least one data stream 636 to the UE 504 that corresponds to the set of transmission ranks 634 over at least one of the clusters 540a-d. In one aspect, when the UE 504 is configured with a transmission rank of one corresponding to one of the clusters 540a-d in the analog beamforming mode, the UE 504 may receive a single data stream 636 over an associated beam pair between the base station 502 and the UE 504. For example, the base station 502 may transmit one data stream to the UE 504 over the first cluster 540a. The UE 504 may receive the data stream 636 via the first beam pair 520a, which may be associated with the first cluster 540a and configured by the base station 502 and the UE 504 as a TCI state.

In another aspect, when the UE 504 is configured with a set of transmission ranks 734 having a transmission rank greater than one or more than one transmission rank, the base station 502 may simultaneously transmit data or control information on a downlink channel to the UE 504 via at least two independent data streams 636 corresponding to the set of transmission ranks 634 associated with at least one of the set of clusters 540a-d. When the UE 504 is configured with a transmission rank of two corresponding to one of the clusters in the hybrid beamforming mode, the UE 504 may receive two independent data streams 636 over the associated beam pair between the base station 502 and the UE 504. For example, the base station 502 may transmit two independent data streams 636 to the UE 504 over the first cluster 540a. The UE 504 may receive the two independent data streams 636 over the first cluster 540a via the first beam pair 520a (each of the data streams 636 may be received at the UE 504 via two polarizations of the antenna elements of the first antenna module 510a).

Alternatively, when the UE 504 is configured with two transmission ranks of one corresponding to two of the clusters in the hybrid beamforming mode, the UE 504 may receive two independent data streams 636 over two associated beam pairs between the base station 502 and the UE 504. For example, the base station 502 may transmit two independent data streams 636 to the UE 504 over the first cluster 540a and the third cluster 540c. The UE 504 may receive one of the two independent data streams 636 over the first cluster 540a via the first beam pair 520a, and may receive another of the two independent data streams 636 over the third cluster 540c via the second beam pair 520b.

While FIG. 6 illustrates downlink communication, the UE 504 may similarly transmit an uplink data stream to the base station 502 based on beam reciprocity associated with one of the beam pairs 520a-b or autonomous uplink beam training by the UE 504 if beam reciprocity or beam correspondence fails. Alternatively, the base station 502 may separately determine a set of transmission ranks 734 for uplink data streams, as described with respect to FIG. 7.

Figure 7:
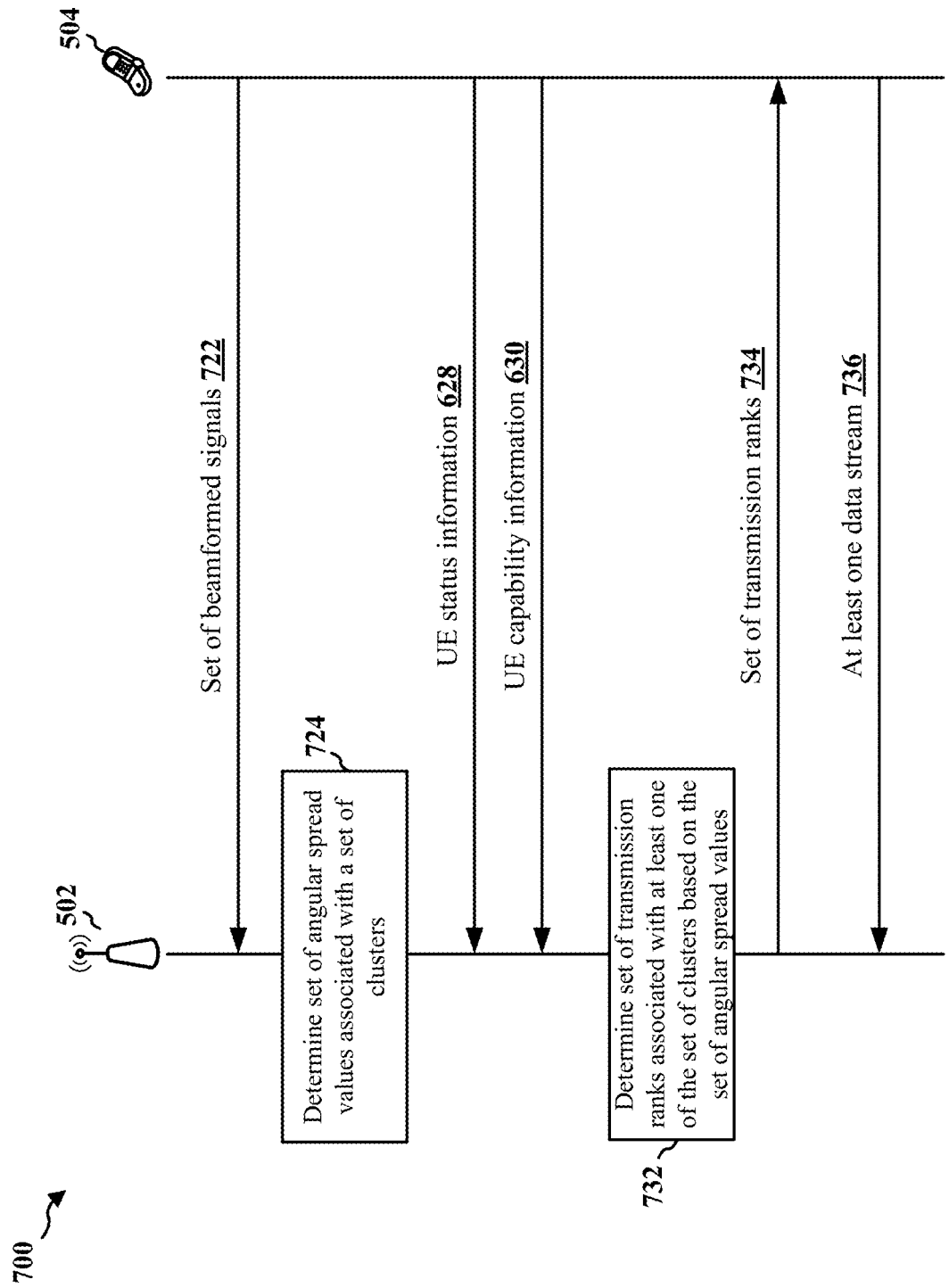
FIG. 7 is a call flow diagram of a wireless communications system.

FIG. 7 illustrates a call flow diagram of a wireless communication system 700 in which the UE 504 is to transmit an uplink data stream to the base station 502. First, the UE 504 may transmit a set of beamformed signals 722 to the base station 502. Each of the set of beamformed signals 722 may be a reference signal. For example, referring to FIG. 5, the UE 504 may transmit signals 542a-d reflected off clusters 540a-d, which may be received by the base station 502 via the beam pairs 520a-b.

Based on the set of beamformed signals 722, the base station 502 may determine 724 a set of angular spread values, with each being associated with one cluster in a channel between the base station 502 and the UE 504. The base station 502 may determine 724 the set of angular spread values similarly to the determination 624 of the angular spread values by the UE 504. For example, the base station 502 may determine 724 the set of angular spread values based on at least one of a respective signal strength associated with each of the set of beamformed signals 722 received from the UE 504 and/or based on a time-domain correlation of a delay spread associated with the set of beamformed signals 722.

The base station 502 may determine 724 the set of angular spread values for each of the top K clusters. For example, the base station 502 may determine that one of the clusters 540a-d is within the top K clusters based on the signal strengths of the set of beamformed signals 722 received by the base station 502 over one of the clusters 540a-d.

The base station 502 may determine 732 a set of transmission ranks associated with at least one of the top K clusters based on the determination 724 of the set of angular spread values. Further, the base station 502 may determine 732 the set of transmission ranks based on UE status information 628 and/or UE capability information 630 received from the UE 504.

According to various aspects, the base station 502 may determine 732 the set of transmission ranks for uplink communication similarly to the determination 632 of the set of transmission ranks 734 for downlink communication. The base station 502 may transmit the set of transmission ranks 734 to the UE 504 to configure the UE 504 for uplink communication with the base station 502.

Once the UE 504 is configured with the set of transmission ranks 734 associated with at least one of the clusters 540a-d, the UE 504 may transmit at least one data stream 736 to the base station 502 that corresponds to the set of transmission ranks 734 over at least one of the clusters 540a-d. In one aspect, when the UE 504 is configured with a transmission rank of one corresponding to one of the clusters 540a-d in the analog beamforming mode, the UE 504 may transmit a single data stream 736 over an associated beam pair between the base station 502 and the UE 504. For example, the base station 502 may receive one data stream 736 from the UE 504 over the first cluster 540a. The UE 504 may transmit the data stream 736 via the first beam pair 520a, which may be associated with the first cluster 540a and configured by the base station 502 in a TCI state.

In another aspect, when the UE 504 is configured with a set of transmission ranks 734 having a transmission rank greater than one or more than one transmission rank, the UE 504 may simultaneously transmit data or control information on an uplink channel to the base station 502 via at least two independent data streams 736 corresponding to the set of transmission ranks 734 associated with at least one of the set of clusters 540a-d. When the UE 504 is configured with a transmission rank of two corresponding to one of the clusters in the hybrid beamforming mode, the UE 504 may transmit two independent data streams 736 over the associated beam pair between the base station 502 and the UE 504. For example, the base station 502 may receive two independent data streams 736 from the UE 504 over the first cluster 540a. The UE 504 may transmit the two independent data streams 736 over the first cluster 540a via the first beam pair 520a (each of the data streams 636 may be received at the UE 504 via two polarizations of the antenna elements of the first antenna module 510a).

Alternatively, when the UE 504 is configured with two transmission ranks of one corresponding to two of the clusters in the hybrid beamforming mode, the UE 504 may transmit two independent data streams 736 over two associated beam pairs between the base station 502 and the UE 504. For example, the base station 502 may receive two independent data streams 736 from the UE 504 over the first cluster 540a and the third cluster 540c. The UE 504 may transmit one of the two independent data streams 736 over the first cluster 540a via the first beam pair 520a, and may receive another of the two independent data streams 736 over the third cluster 540c via the second beam pair 520b.

Figure 8:
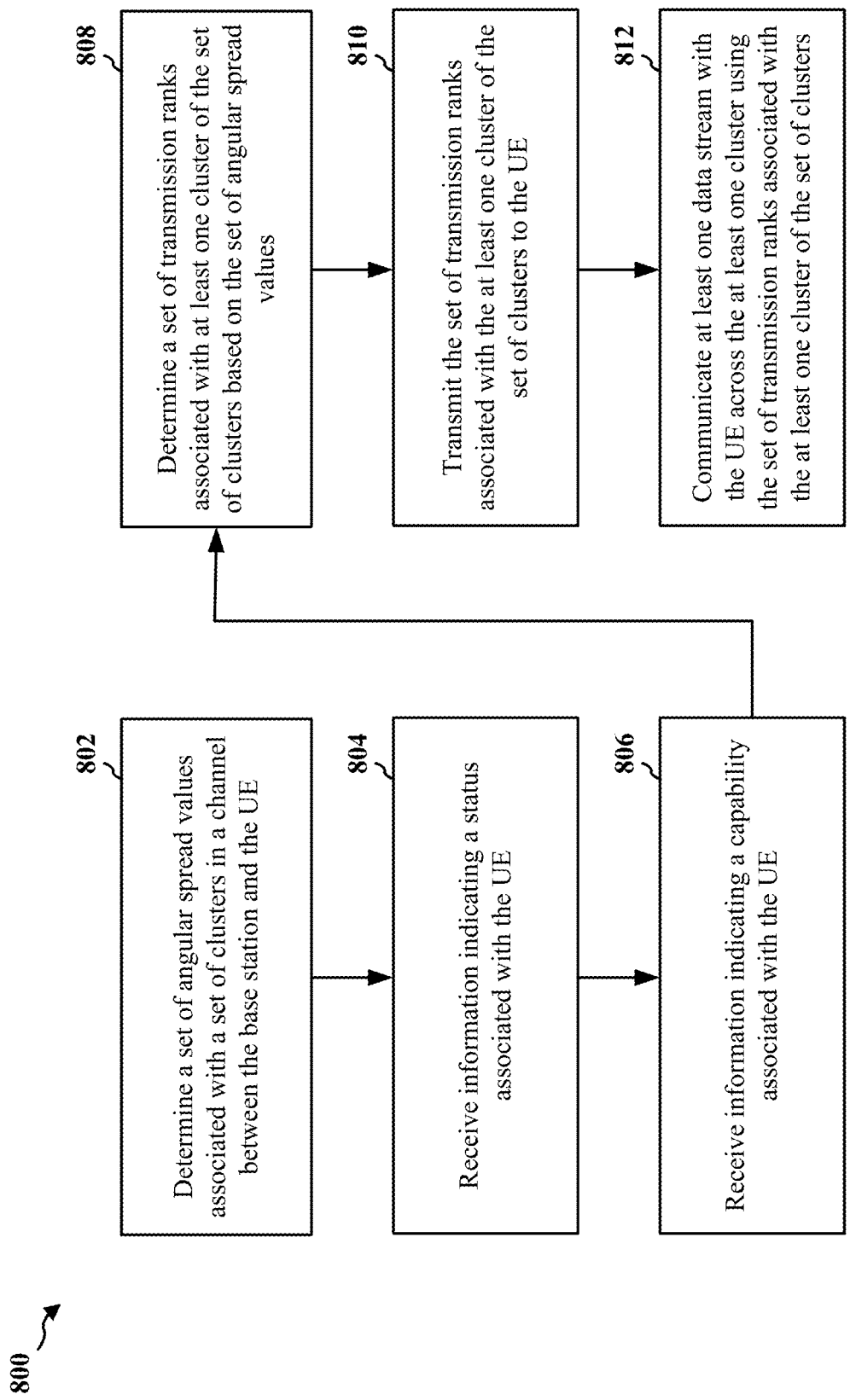
FIG. 8 is a flowchart of a method of wireless communication.

FIG. 8 is a flowchart of a method 800 of wireless communication. The method may be performed by a base station (e.g., the base station 102/180, 310, 402, 502; the apparatus 902/902'; the processing system 1014, which may include the memory 376 and which may be the entire base station 310 or a component of the base station 310, such as the TX processor 316, the RX processor 370, and/or the controller/processor 375). According to various aspects, one or more of the illustrated operations may be transposed, omitted, and/or contemporaneously performed.

At operation 802, the base station may determine a set of angular spread values associated with a set of clusters in a channel between the base station and a UE. In addition, the base station may determine the ranking of each of the clusters based on signal strengths of signals received over each of the set of clusters. In one aspect, the base station may transmit a set of beamformed signals to the UE, and the base station may receive the set of angular spread values from the UE based on the set of beamformed signals. The base station may use the set of angular spread values to determine a set of transmission ranks for downlink communication. For example, referring to FIGS. 5-6, the base station 502 may transmit the set of beamformed signals 622 to the UE 504, and the base station 502 may receive the set of angular spread values 626 from the UE 504 based on the set of beamformed signals 622.

In another aspect, the base station may determine the set of angular spread values for uplink communication based on receiving a set of beamformed signals from the UE, and determining the set of angular spread values based on the received set of beamformed signals. The base station may determine the set of angular spread values based on at least one of a respective signal strength associated with each of the set of beamformed signals received from the UE or based on a time-domain correlation of a delay spread associated with the set of beamformed signals received from the UE. The signal strengths of the set of beamformed signals may be one of an RSSI, an RSRP, an RSRQ, an SINR, or an SNR. Further, the base station may determine and weigh the set of angular spread values based on each direction associated with each of the set of clusters. For example, referring to FIGS. 5 and 7, the base station 502 may receive the set of beamformed signals 722 from the UE 504, and the base station 502 may determine 724 the set of angular spread values based on the set of beamformed signals 722 received from the UE 504.

At operation 804, the base station may receive information indicating a status associated with the UE. The information indicating the status associated with the UE may indicate at least one of a data rate associated with the UE, a thermal status associated with the UE, and/or a power status associated with the UE. For example, referring to FIGS. 5-7, the base station 502 may receive the UE status information 628 from the UE 504.

At operation 806, the base station may receive information indicating a capability associated with the UE, such as a hardware and/or signal processing capability of the UE. The information indicating the capability associated with the UE may indicate at least one of a number of RF chains associated with each antenna module of the UE that is available to support at least two independent data streams or a number of RF chains associated with all antenna modules of the UE. For example, referring to FIGS. 5-7, the base station 502 may receive the UE capability information 630 from the UE 504.

At operation 808, the base station may determine a set of transmission ranks associated with at least one cluster of the set of clusters based on the set of angular spread values. The base station may determine the set of transmission ranks further based on the information indicating the status associated with the UE and/or based on the information indicating the capability associated with the UE. The base station may determine the set of transmission ranks to include a transmission rank of one, which may correspond to a single data stream over an associated beam pair between the base station and the UE. Alternatively, the base station may determine the set of transmission ranks to be higher than one, which may correspond to at least two data streams over at least one associated beam pair between the base station and the UE. For example, referring to FIGS. 5-6, the base station 502 may determine 632 the set of transmission ranks associated with at least one of the set of clusters 540a-d based on the set of angular spread values 626 received from the UE 504. In another example, referring to FIGS. 5 and 7, the base station 502 may determine 732 the set of transmission ranks associated with at least one of the set of clusters 540a-d based on the set of angular spread values determined 724 by the base station 502.

At operation 810, the base station may transmit the set of transmission ranks associated with at least one cluster of the set of clusters to the UE. For example, referring to FIGS. 5-6, the base station 502 may transmit the set of transmission ranks 634 associated with at least one of the set of clusters 540a-d to the UE 504. In another example, referring to FIGS. 5 and 7, the base station 502 may transmit the set of transmission ranks 734 associated with at least one of the set of clusters 540a-d to the UE 504.

At operation 812, the base station may communicate at least one data stream with the UE across the at least one cluster using the set of transmission ranks associated with the at least one cluster of the set of clusters. In one aspect, the set of transmission ranks may include a transmission rank of one associated with one cluster of the set of clusters. Accordingly, the base station may transmit or receive data or control information to or from the UE as a single data stream over one cluster using one beam pair associated with the one cluster. In another aspect, the base station may determine that the set of transmission ranks includes a transmission rank of two associated with one cluster or the set of transmission ranks includes one transmission rank of one associated with one cluster and another transmission rank of one associated with another cluster.

The base station may simultaneously transmit data or control information on a downlink channel to the UE via at least two independent data streams corresponding to the set of transmission ranks associated with the at least one cluster of the set of clusters. For example, referring to FIGS. 5-6, the base station 502 may simultaneously transmit data or control information on a downlink channel to the UE 504 via at least two independent data streams 636 corresponding to the set of transmission ranks 634 associated with at least one cluster of the set of clusters 540a-d.

Alternatively, the base station may simultaneously receive data or control information from the UE via at least two independent data streams corresponding to the set of transmission ranks associated with the at least one cluster of the set of cluster. For example, referring to FIGS. 5 and 7, the base station 502 may simultaneously receive data or control information from the UE 504 via at least two independent data streams 736 corresponding to the set of transmission ranks 734 associated with the at least one cluster of the set of clusters 540a-d.

Figure 9:
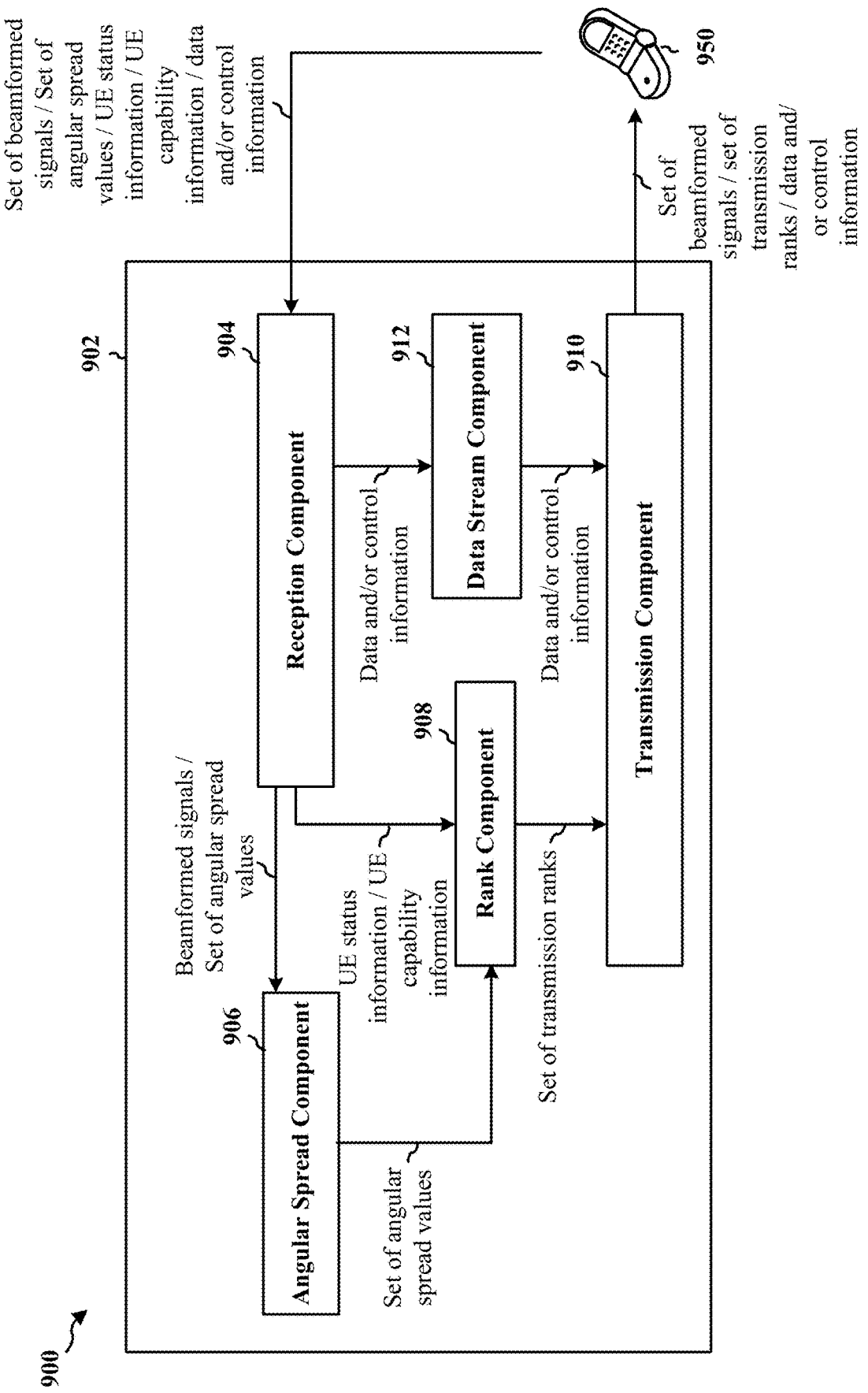
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station. The apparatus 902 may include a reception component 904 configured to receive signals from a UE 950. The apparatus 902 may further includes a transmission component 910 configured to transmit signals to the UE 950.

The apparatus 902 may include an angular spread component 906. The angular spread component 906 may be configured to determine a set of angular spread values associated with a set of clusters in a channel between the apparatus 902 and the UE, for example, as described in connection with operation 802. In one aspect, the transmission component 910 may transmit a set of beamformed signals to the UE 950, and the angular spread component 906 may receive information indicating the set of angular spread values from the UE 950 based on the set of beamformed signals. For example, the set of angular spread values associated with the set of clusters may be determined based on at least one of a respective signal strength associated with each of the set of beamformed signals received from the UE 950, or based on a time-domain correlation of a delay spread associated with the set of beamformed signals received from the UE. The respective signal strength may be one of an RSSI, RSRP, RSRQ, SINR, and/or SNR. Further, the angular spread component 906 may determine the set of angular spread values based on each direction associated with each of the set of clusters. In another aspect, the reception component 904 may receive a set of beamformed signals from the UE 950, and the angular spread component 906 may determine the set of angular spread values based on the received set of beamformed signals.

The reception component 904 may further receive UE status information and/or UE capability information from the UE 950, for example, as described in connection with operation 804 and operation 806, respectively. The UE status information may indicate at least one of a data rate associated with the UE, a thermal status associated with the UE, and/or a power status associated with the UE. The UE capability information may indicate at least one of a number of RF chains associated with each antenna module of the UE 950 that is available to support at least two independent data streams, or a number of RF chains associated with all antenna modules of the UE 950.

The UE status information and UE capability information may be provided to a rank component 908, in addition to the determined set of angular spread values. The rank component 908 may determine a set of transmission ranks associated with at least one cluster of the set of clusters based on the set of angular spread values, for example, as described in connection with operation 808. The rank component 908 may further determine the set of transmission ranks based on the UE status information and/or UE capability information. The rank component 908 may determine a transmission rank of one corresponding to a single data stream over an associated beam pair between the apparatus 902 and the UE 950, and may determine a transmission rank higher than one corresponding to at least two data streams over at least one associated beam pair between the apparatus 902 and the UE 950.

The rank component 908 may provide the set of transmission ranks associated with at least one cluster of the set of clusters to the transmission component 910. The transmission component 910 may transmit the set of transmission ranks associated with the at least one cluster of the set of clusters to the UE 950, for example, as described in connection with operation 810.

For downlink communication, the transmission component 910 may communicate at least one data stream with the UE 950 across the at least one cluster using the set of transmission ranks associated with the at least one cluster of the set of clusters, for example, as described in connection with operation 812. For example, the transmission component 910 may be configured according to the set of transmission ranks associated with at least one cluster of the set of clusters. In addition, a data stream component 912 may provide data and/or control information to be transmitted to the UE 950. The transmission component 910 may simultaneously transmit the data or control information on a downlink channel to the UE 950 via at least two independent data streams corresponding to the set of transmission ranks associated with the at least one cluster of the set of clusters.

For uplink communication, the reception component 904 may communicate at least one data stream with the UE 950 across the at least one cluster using the set of transmission ranks associated with the at least one cluster of the set of clusters, for example, as described in connection with operation 812. For example, the reception component 904 may be configured according to the set of transmission ranks associated with at least one cluster of the set of clusters. The reception component 904 may simultaneously receive data or control information on an uplink channel from the UE 950 via at least two independent data streams corresponding to the set of transmission ranks associated with the at least one cluster of the set of clusters.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
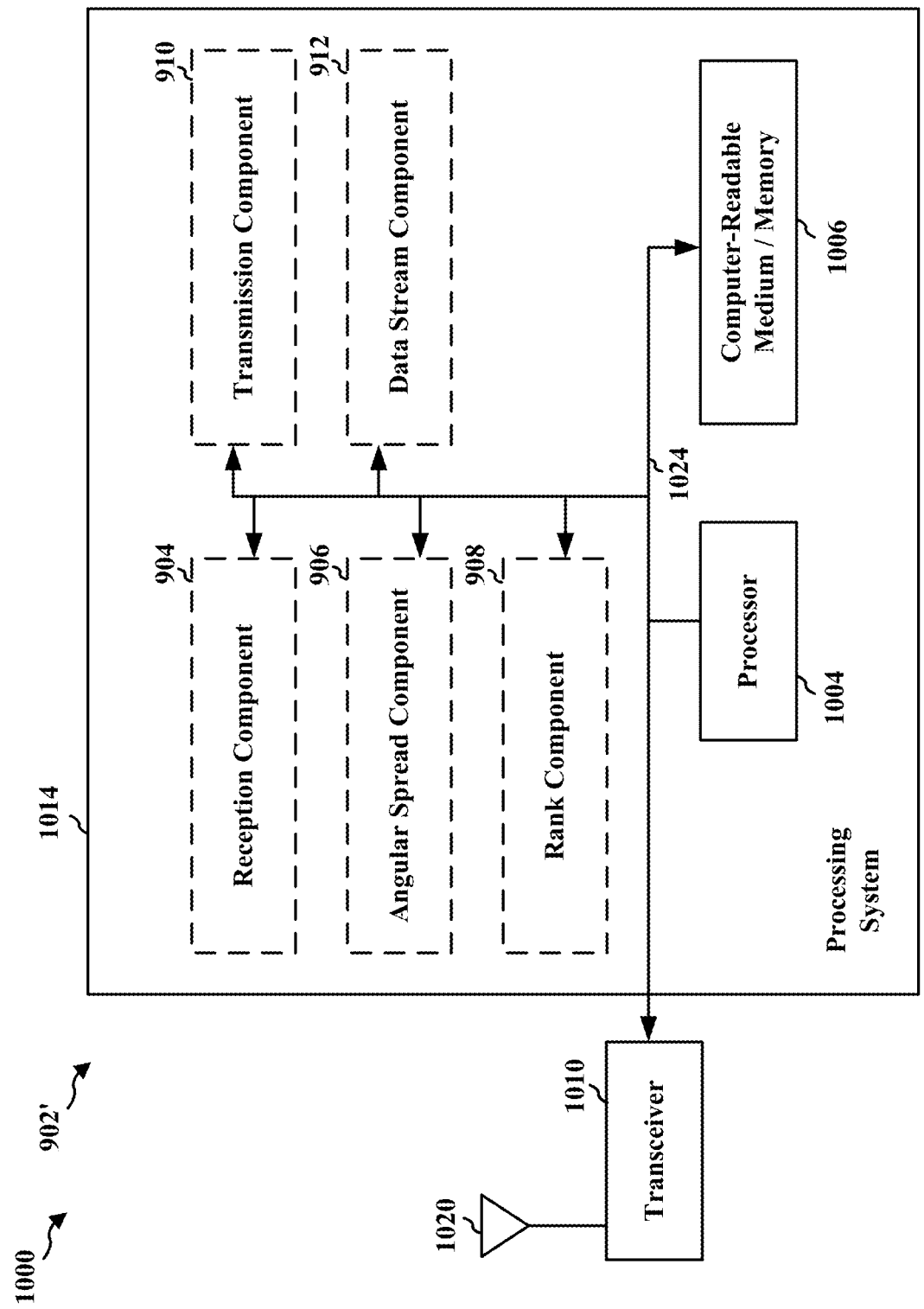
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for determining a set of angular spread values associated with a set of clusters in a channel between the base station and a UE. The apparatus 902/902' may include means for determining a set of transmission ranks associated with at least one cluster of the set of clusters based on the set of angular spread values. The apparatus 902/902' may include means for transmitting the set of transmission ranks associated with the at least one cluster of the set of clusters to the UE. The apparatus 902/902' may include means for communicating at least one data stream with the UE across the at least one cluster using the set of transmission ranks associated with the at least one cluster of the set of clusters.

In one aspect, the apparatus 902/902' further includes means for transmitting a set of beamformed signals to the UE; and means for receiving, from the UE, information indicating the set of angular spread values based on the set of beamformed signals, and the set of angular spread values is determined based on the information indicating the set of angular spread values received from the UE.

In one aspect, the apparatus 902/902' further includes means for receiving a set of beamformed signals from the UE, and the set of angular spread values is determined based on the set of beamformed signals received from the UE.

In one aspect, the set of angular spread values associated with the set of clusters is determined based on at least one of: a respective signal strength associated with each of the set of beamformed signals received from the UE, or a time-domain correlation of a delay spread associated with the set of beamformed signals received from the UE. The respective signal strength may include at least one of: an RSSI, an RSRP, an RSRQ, an SINR, or an SNR.

In one aspect, the set of angular spread values associated with the set of clusters is determined further based on each direction associated with each of the set of clusters.

In one aspect, the apparatus 902/902' further includes means for receiving information indicating a status associated with the UE, and the determining the set of transmission ranks associated with each of the set of clusters is based on the information indicating the status associated with the UE.

In one aspect, the information indicating the status associated with the UE indicates at least one of: a data rate associated with the UE, a thermal status associated with the UE, or a power status associated with the UE.

In one aspect, the set of transmission ranks comprises at least one of: a transmission rank of one corresponding to a single data stream over an associated beam pair between the base station and the UE, or a transmission rank higher than one corresponding to at least two data streams over at least one associated beam pair between the base station and the UE.

In one aspect, the means for communicating the at least one data stream with the UE across the at least one cluster using the set of transmission ranks associated with the at least one cluster of the set of clusters is configured to: simultaneously transmit data or control information on a downlink channel to the UE via at least two independent data streams corresponding to the set of transmission ranks associated with the at least one cluster of the set of clusters. In another aspect, the means for communicating the at least one data stream with the UE across each of the set of transmission ranks over the set of clusters is configured to: simultaneously receive data or control information on an uplink channel from the UE via at least two independent data streams corresponding to the set of transmission ranks associated with the at least one cluster of the set of clusters.

In one aspect, the apparatus 902/902' further includes means for receiving, from the UE, information indicating a capability associated with the UE, and the at least one data stream is communicated based on the information indicating the capability associated with the UE. In one aspect, the information indicating the capability associated with the UE indicates at least one of: a number of RF chains associated with each antenna module of the UE that is available to support at least two independent data streams, or a number of RF chains associated with all antenna modules of the UE.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
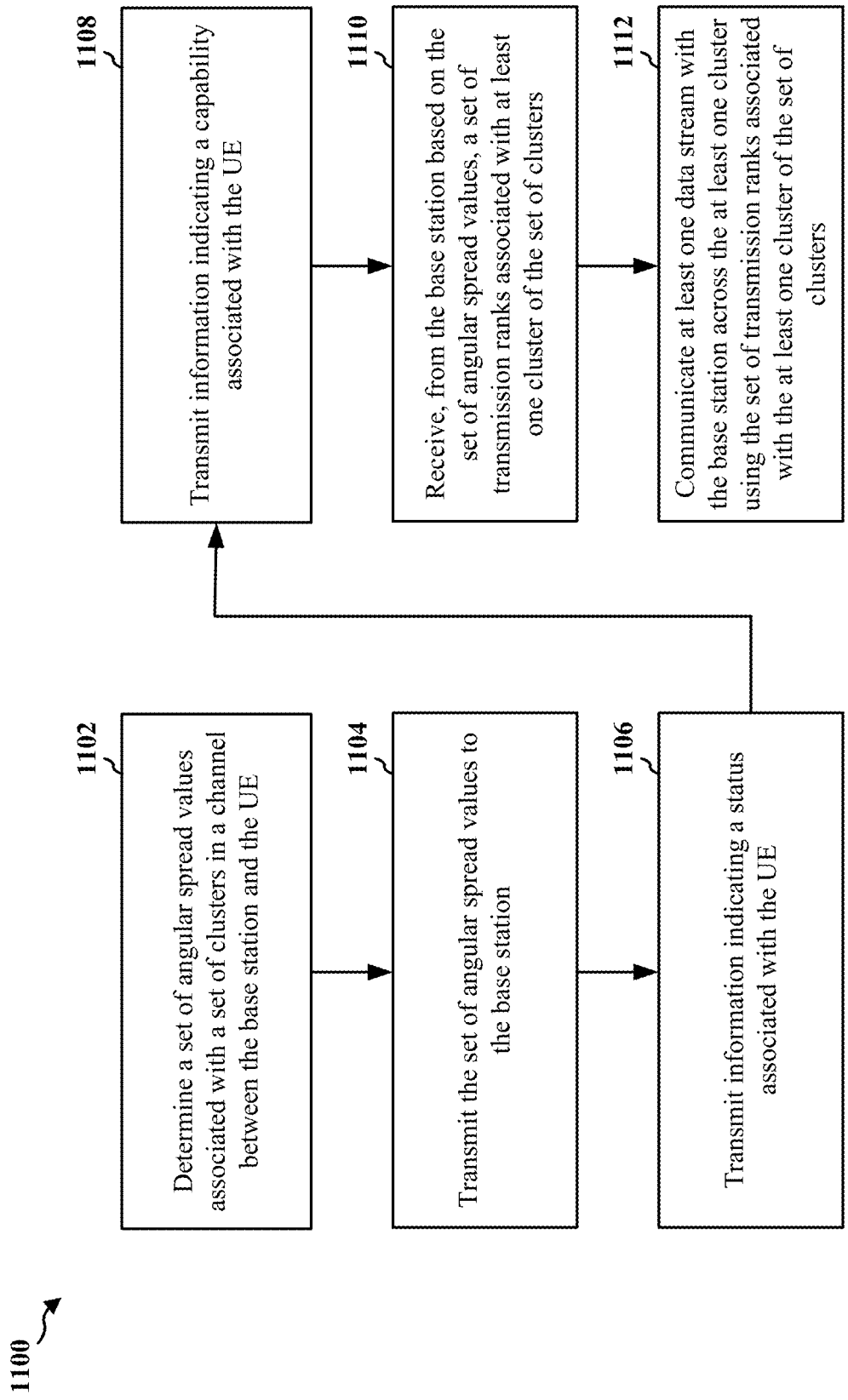
FIG. 11 is a flowchart of a method of wireless communication.

FIG. 11 is a flowchart of a method 1100 of wireless communication. The method may be performed by a UE (e.g., the UE 104, 350, 404, 504; the apparatus 1202/1202'; the processing system 1314, which may include the memory 360 and which may be the entire UE 350 or a component of the UE 350, such as the TX processor 368, the RX processor 356, and/or the controller/processor 359). According to various aspects, one or more of the illustrated operations may be transposed, omitted, and/or contemporaneously performed.

At operation 1102, the UE may determine a set of angular spread values associated with a set of clusters in a channel between the base station and the UE. For example, the UE may receive a set of beamformed signals from the base station, and the UE may determine the set of angular spread values based on the set of beamformed signals received from the base station. The UE may determine the set of angular spread values associated with the set of cluster based on at least one of a respective signal strength associated with each of the set of beamformed signals received from the base station, or based on a time-domain correlation of a delay spread associated with the set of beamformed signals. The respective signal strength may be one of an RSSI, an RSRP, an RSRQ, an SINR, and/or an SNR. Further, the UE may determine the set of angular spread values associated with the set of clusters based on a beam steering direction and a beam width associated with a beam via which at least one of the set of beamformed signals is received. For example, referring to FIGS. 5-6, the UE 504 may determine 624 a set of angular spread values 626 based on the set of beamformed signals 622 received from the base station 502.

At operation 1104, the UE may transmit the set of angular spread values to the base station. For example, referring to FIGS. 5-6, the UE 504 may transmit the set of angular spread values 626 to the base station 502.

At operation 1106, the UE may transmit information indicating a status associated with the UE to the base station. The information indicating the status associated with the UE may indicate at least one of a data rate associated with the UE, a thermal status associated with the UE, or a power status associated with the UE. For example, referring to FIGS. 5-7, the UE 504 may transmit the UE status information 628 to the base station 502.

At operation 1108, the UE may transmit information indicating a capability associated with the UE to the base station. The information indicating the status associated with the UE may indicate a hardware or signal processing capability of the UE, such as a number of RF chains associated with each antenna module of the UE that is available to support independent data streams, or a number of RF chains associated with all the antenna modules of the UE. For example, referring to FIGS. 5-7, the UE 504 may transmit the UE capability information 630 to the base station 502.

At operation 1110, the UE may receive, from the base station based on the set of angular spread values, a set of transmission ranks associated with at least one cluster of the set of clusters. The set of transmission ranks may be further based on the information indicating the status associated with the UE and/or based on the information indicating the capability associated with the UE. The UE may receive the set of transmission ranks including a transmission rank of one, which may correspond to a single data stream over an associated beam pair between the base station and the UE. Alternatively, the UE may receive the set of transmission ranks including a transmission rank to higher than one, which may correspond to at least two data streams over at least one associated beam pair between the base station and the UE. For example, referring to FIGS. 5-6, the UE 504 may receive the set of transmission ranks 634 associated with at least one of the set of clusters 540a-d based on the set of angular spread values 626 determined 624 by the UE 504. In another example, referring to FIGS. 5 and 7, the UE 504 may receive the set of transmission ranks 734 associated with at least one of the set of clusters 540a-d based on the set of angular spread values determined 724 by the base station 502.

At operation 1112, the UE may communicate at least one data stream with the base station across the at least one cluster using the set of transmission ranks associated with the at least one cluster of the set of clusters. In one aspect, the set of transmission ranks may include a transmission rank of one associated with one cluster of the set of clusters. Accordingly, the UE may transmit or receive data or control information to or from the base station as a single data stream over one cluster using one beam pair associated with the one cluster.

In another aspect, the set of transmission ranks includes a transmission rank of two associated with one cluster or the set of transmission ranks includes one transmission rank of one associated with one cluster and another transmission rank of one associated with another cluster. The UE may simultaneously transmit data or control information on an uplink channel to the base station via at least two independent data streams corresponding to the set of transmission ranks associated with the at least one cluster of the set of clusters. The UE may transmit the data or control information on the uplink channel via an uplink beam pair configured between the UE and the base station based on at least one of beam reciprocity associated with a downlink beam pair configured between the UE and the base station, or based on autonomous uplink beam training by the UE. For example, referring to FIGS. 5 and 7, the UE 504 may simultaneously transmit data or control information to the base station 502 via at least two independent data streams 736 corresponding to the set of transmission ranks 734 associated with the at least one cluster of the set of clusters 540*a-d*.

Alternatively, the base station may simultaneously receive data or control information from the UE via at least two independent data streams corresponding to the set of transmission ranks associated with the at least one cluster of the set of cluster. For example, referring to FIGS. 5-6, the UE 504 may simultaneously receive data or control information on a downlink channel from the base station 502 via at least two independent data streams 636 corresponding to the set of transmission ranks 634 associated with at least one cluster of the set of clusters 540*a-d*.

Figure 12:
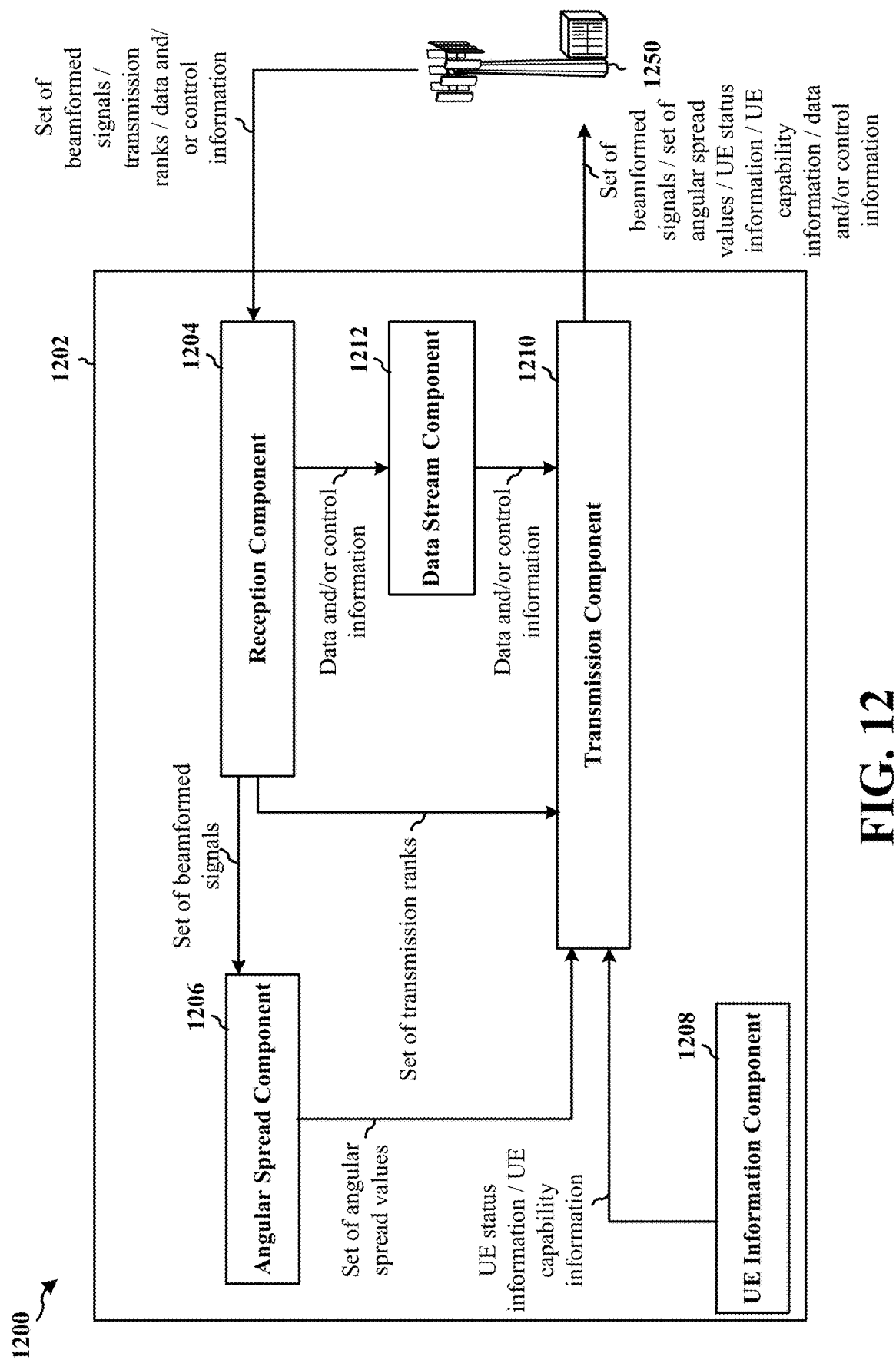
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus 1202 may be a UE. The apparatus 1202 may include a reception component 1204 configured to receive signals from a base station 1250. The apparatus 1202 may further include a transmission component 1210 configured to transmit signals to the base station 1250.

The apparatus 1202 may include an angular spread component 1206. The reception component 1204 may receive a set of beamformed signals, and the angular spread component 1206 may determine the set of angular spread values associated with a set of clusters in a channel between the base station 1250 and the apparatus 1202 based on the set of beamformed signals received from the base station 1250, for example, as described in connection with operation 1102.

The angular spread component 1206 may determine the set of angular spread values associated with the set of clusters based on at least one of a respective signal strength associated with each of the set of beamformed signals received from the base station, or based on a time-domain correlation of a delay spread associated with the set of beamformed signals. The respective signal strength may be one of an RSSI, an RSRP, an RSRQ, an SINR, or an SNR. The angular spread component 1206 may determine the set of angular spread values further based on a beam steering direction and a beam width associated with a beam via which at least one of the set of beamformed signals is received.

The angular spread component 1206 may provide the set of angular spread values to the transmission component 1210. The transmission component 1210 may transmit the set of angular spread values to the base station 1250, for example, as described in connection with operation 1104. A UE information component 1208 may also determine UE status information and/or UE capability information. The UE status information may indicate at least one of a data rate associated with the apparatus 1202, a power status associated with the apparatus 1202, and/or a thermal status associated with the apparatus 1202. The UE capability information may indicate at least one of a number of RF chains associated with each antenna module of the apparatus 1202 that is available to support independent data streams, or a number of RF chains associated with all the antenna modules of the apparatus 1202.

The UE information component 1208 may provide the UE status information and/or UE capability information to the transmission component 1210. The transmission component 1210 may transmit the UE status information to the base station 1250, for example, as described in connection with operation 1106. The transmission component 1210 may transmit the UE capability information to the base station 1250, for example, as described in connection with operation 1108.

The reception component 1204 may receive, from the base station 1250 based on the set of angular spread values, a set of transmission ranks associated with at least one cluster of the set of clusters, for example, as described in connection with operation 1110. The set of transmission ranks may be further based on the UE status information and/or UE capability information. In the set of transmission ranks, a transmission rank of one may correspond to a single data stream over an associated beam pair between the apparatus 1202 and the base station 1250, and a transmission rank higher than one may correspond to at least two data streams over at least one associated beam pair between the apparatus 1202 and the base station 1250.

For uplink communication, the reception component 1204 may provide the set of transmission ranks to the transmission component 1210 in order to configure the transmission component 1210 for uplink communication. For downlink communication, the reception component 1204 may configure the reception component 1204 based on the set of transmission ranks.

For uplink communication, the transmission component 1210 may communicate at least one data stream with the base station 1250 across the at least one cluster using the set of transmission ranks associated with the at least one cluster of the set of clusters, for example, as described in connection with operation 1112. For example, the transmission component 1210 may be configured according to the set of transmission ranks associated with at least one cluster of the set of clusters. In addition, a data stream component 1212 may provide data and/or control information to be transmitted to the base station 1250. The transmission component 1210 may simultaneously transmit the data or control information on an uplink channel to the base station 1250 via at least two independent data streams corresponding to the set of transmission ranks associated with the at least one cluster of the set of clusters. In one aspect, the data or control information is transmitted on the uplink channel via an uplink beam pair configured between the apparatus 1202 and the base station 1250 based on at least one of beam reciprocity associated with a downlink beam pair configured between the apparatus 1202 and the base station 1250 or autonomous uplink beam training by the apparatus 1202.

For downlink communication, the reception component 1204 may communicate at least one data stream with the base station 1250 across the at least one cluster using the set of transmission ranks associated with the at least one cluster of the set of clusters, for example, as described in connection with operation 1112. For example, the reception component 1204 may be configured according to the set of transmission ranks associated with at least one cluster of the set of clusters. The reception component 1204 may simultaneously receive data or control information on a downlink channel from the base station 1250 via at least two independent data streams corresponding to the set of transmission ranks associated with the at least one cluster of the set of clusters.

The apparatus may include additional components that perform each of the blocks of the algorithm in the aforementioned flowcharts of FIG. 11. As such, each block in the aforementioned flowcharts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
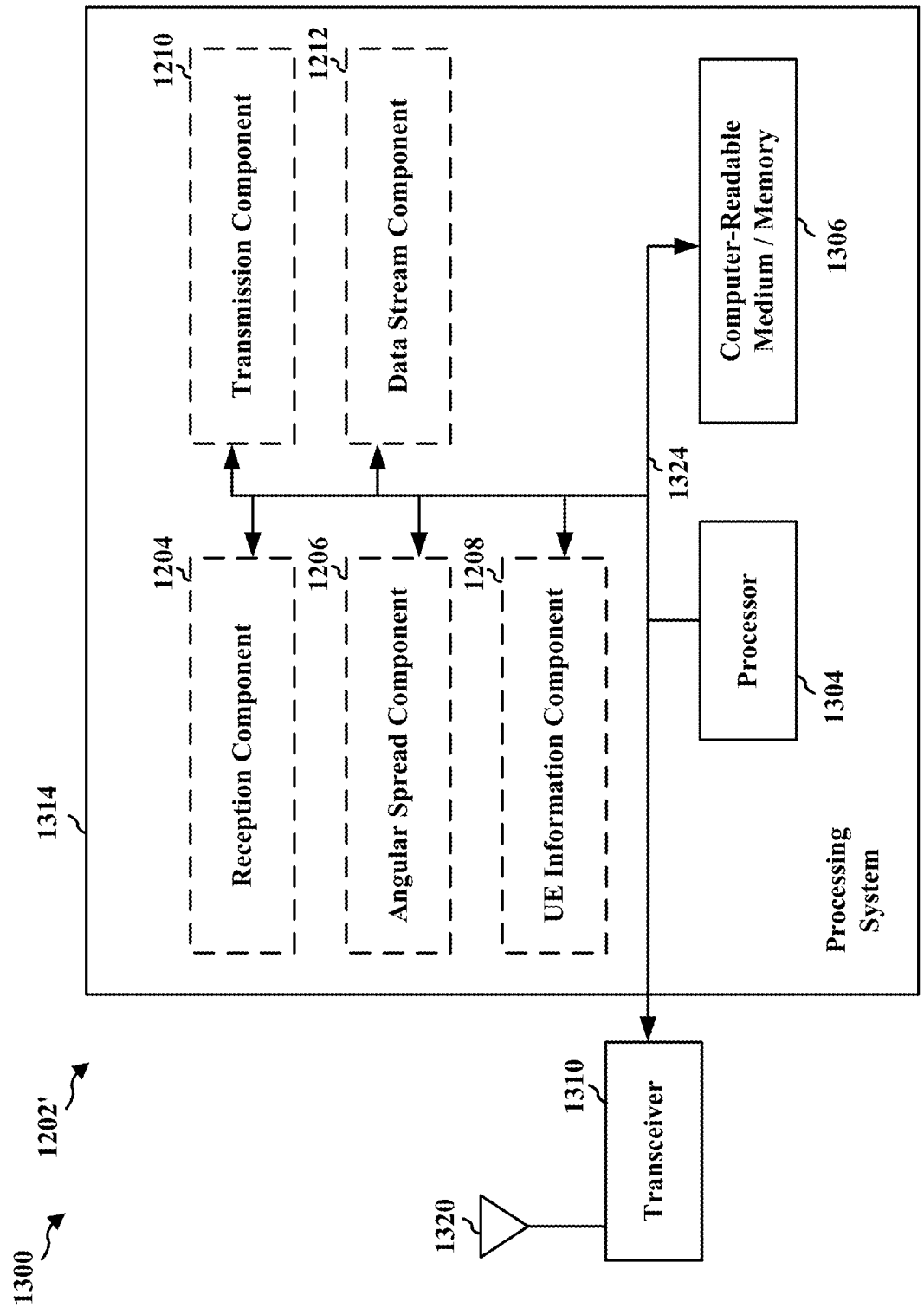
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for receiving a set of beamformed signals from a base station. The apparatus 1202/1202' may include means for determining a set of angular spread values associated with a set of clusters in a channel between the base station and the UE based on the set of beamformed signals received from the base station. The apparatus 1202/1202' may include means for transmitting the set of angular spread values to the base station. The apparatus 1202/1202' may include means for receiving, from the base station based on the set of angular spread values, a set of transmission ranks associated with at least one cluster of the set of clusters. The apparatus 1202/1202' may include means for communicating at least one data stream with the base station across the at least one cluster using the set of transmission ranks associated with the at least one cluster of the set of clusters.

In one aspect, the apparatus 1202/1202' may include means for transmitting, to the base station, information indicating a status associated with the apparatus 1202/1202', and the set of transmission ranks is received further based on the information indicating the status associated with the apparatus 1202/1202'. In one aspect, the information indicating the status associated with the apparatus 1202/1202' indicates at least one of: a data rate associated with the apparatus 1202/1202', a thermal status associated with the apparatus 1202/1202', or a power status associated with the apparatus 1202/1202'.

In one aspect, the set of transmission ranks comprises at least one of: a transmission rank of one corresponding to a single data stream over an associated beam pair between the base station and the apparatus 1202/1202', or a transmission rank higher than one corresponding to at least two independent data streams over at least one associated beam pair between the base station and the apparatus 1202/1202'.

In one aspect, the means for communicating the at least one data stream with the base station across the at least one cluster using the set of transmission ranks associated with the at least one cluster of the set of clusters is configured to: simultaneously receive data or control information on a downlink channel from the base station via at least two independent data stream corresponding to the set of transmission ranks associated with the at least one cluster of the set of clusters. In one aspect, the means for communicating the at least one data stream with the base station across the at least one cluster using the set of transmission ranks associated with the at least one cluster of the set of clusters is configured to: simultaneously transmit data or control information on an uplink channel to the base station via at least two independent data stream corresponding to the set of transmission ranks associated with the at least one cluster of the set of clusters.

In one aspect, the data or control information is transmitted on the uplink channel via an uplink beam pair configured between the apparatus 1202/1202' and the base station based on at least one of beam reciprocity associated with a downlink beam pair configured between the apparatus 1202/1202' and the base station or autonomous uplink beam training by the apparatus 1202/1202'.

In one aspect, the apparatus 1202/1202' further includes means for transmitting, to the base station, information indicating a capability associated with the apparatus 1202/1202', and the at least one data stream is communicated based on the information indicating the capability associated with the apparatus 1202/1202'.

In one aspect, the information indicating the capability associated with the apparatus 1202/1202' indicates at least one of: a number of RF chains associated with each antenna module of the apparatus 1202/1202' that is available to support independent data streams, or a number of RF chains associated with all antenna modules of the apparatus 1202/1202'.

In one aspect, the set of angular spread values associated with the set of clusters is determined based on at least one of: a respective signal strength associated with each of the set of beamformed signals received from the base station, or a time-domain correlation of a delay spread associated with the set of beamformed signals. The respective signal strength may be at least one of an RSSI, RSRP, RSRQ, SINR, and/or SNR.

In one aspect, the set of angular spread values associated with the set of clusters is determined further based on a beam steering direction and a beam width associated with a beam via which at least one of the set of beamformed signals is received.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication by a base station, the apparatus comprising:
   a memory; and
   at least one processor coupled to the memory and configured to:
   determine a set of angular spread values associated with a set of clusters in a channel between the base station and a user equipment (UE), a respective angular spread value of the set of angular spread values being associated with each cluster of the set of clusters;
   determine a set of transmission ranks associated with at least one cluster of the set of clusters based on the set of angular spread values and based on a number of radio frequency (RF) chains at the UE;
   transmit the set of transmission ranks associated with the at least one cluster of the set of clusters to the UE; and
   communicate at least one data stream with the UE across the at least one cluster using the set of transmission ranks associated with the at least one cluster of the set of clusters.

2. The apparatus of claim 1, wherein the at least one processor is further configured to:
   transmit a set of beamformed signals to the UE; and
   receive, from the UE, information indicating the set of angular spread values based on the set of beamformed signals,
   wherein the set of angular spread values is determined based on the information indicating the set of angular spread values received from the UE.

3. The apparatus of claim 1, wherein the at least one processor is further configured to:
   receive a set of beamformed signals from the UE,
   wherein the set of angular spread values is determined based on the set of beamformed signals received from the UE.

4. The apparatus of claim 3, wherein the set of angular spread values associated with the set of clusters is determined based on at least one of:
   a respective signal strength associated with each of the set of beamformed signals received from the UE, or
   a time-domain correlation of a delay spread associated with the set of beamformed signals received from the UE.

5. The apparatus of claim 4, wherein the respective signal strength comprises at least one of:
   a reference signal strength indicator (RSSI),
   a reference signal received power (RSRP),
   a reference signal received quality (RSRQ),
   a signal-to-interference-and-noise ratio (SINR), or
   a signal-to-noise ratio (SNR).

6. The apparatus of claim 3, wherein the set of angular spread values associated with the set of clusters is determined further based on each direction associated with each of the set of clusters.

7. The apparatus of claim 1, wherein the at least one processor is further configured to:
receive information indicating a status associated with the UE,
wherein the set of transmission ranks associated with each of the set of clusters is determined based on the information indicating the status associated with the UE.

8. The apparatus of claim 7, wherein the information indicating the status associated with the UE indicates at least one of:
a data rate associated with the UE,
a thermal status associated with the UE, or
a power status associated with the UE.

9. The apparatus of claim 1, wherein the set of transmission ranks comprises at least one of:
a transmission rank of one corresponding to a single data stream over an associated beam pair between the base station and the UE, or
a transmission rank higher than one corresponding to at least two data streams over at least one associated beam pair between the base station and the UE.

10. The apparatus of claim 1, wherein the communication of the at least one data stream with the UE across the at least one cluster using the set of transmission ranks associated with the at least one cluster of the set of clusters comprises to:
simultaneously transmit data or control information on a downlink channel to the UE via at least two independent data streams corresponding to the set of transmission ranks associated with the at least one cluster of the set of clusters.

11. The apparatus of claim 1, wherein the communication of the at least one data stream with the UE across each of the set of transmission ranks over the set of clusters comprises to:
simultaneously receive data or control information on an uplink channel from the UE via at least two independent data streams corresponding to the set of transmission ranks associated with the at least one cluster of the set of clusters.

12. The apparatus of claim 1, wherein the at least one processor is further configured to:
receive, from the UE, information indicating a capability associated with the UE,
wherein the at least one data stream is communicated based on the information indicating the capability associated with the UE.

13. The apparatus of claim 12, wherein the information indicating the capability associated with the UE indicates at least one of:
the number of RF chains associated with each antenna module of the UE that is available to support at least two independent data streams, or
the number of RF chains associated with all antenna modules of the UE.

14. A apparatus of wireless communication by a user equipment (UE), the apparatus comprising:
a memory; and
at least one processor coupled to the memory and configured to:
receive a set of beamformed signals from a base station;
determine a set of angular spread values associated with a set of clusters in a channel between the base station and the UE based on the set of beamformed signals received from the base station, a respective angular spread value of the set of angular spread values being associated with each cluster of the set of clusters;
transmit the set of angular spread values to the base station;
receive, from the base station based on the set of angular spread values and based on a number of radio frequency (RF) chains at the UE, a set of transmission ranks associated with at least one cluster of the set of clusters; and
communicate at least one data stream with the base station across the at least one cluster using the set of transmission ranks associated with the at least one cluster of the set of clusters.

15. The apparatus of claim 14, wherein the at least one processor is further configured to:
transmit, to the base station, information indicating a status associated with the UE,
wherein the set of transmission ranks is received further based on the information indicating the status associated with the UE.

16. The apparatus of claim 15, wherein the information indicating the status associated with the UE indicates at least one of:
a data rate associated with the UE,
a thermal status associated with the UE, or
a power status associated with the UE.

17. The apparatus of claim 14, wherein the set of transmission ranks comprises at least one of:
a transmission rank of one corresponding to a single data stream over an associated beam pair between the base station and the UE, or
a transmission rank higher than one corresponding to at least two independent data streams over at least one associated beam pair between the base station and the UE.

18. The apparatus of claim 14, wherein the communication of the at least one data stream with the base station across the at least one cluster using the set of transmission ranks associated with the at least one cluster of the set of clusters comprises to:
simultaneously receive data or control information on a downlink channel from the base station via at least two independent data stream corresponding to the set of transmission ranks associated with the at least one cluster of the set of clusters.

19. The apparatus of claim 14, wherein the communication of the at least one data stream with the base station across the at least one cluster using the set of transmission ranks associated with the at least one cluster of the set of clusters comprises to:
simultaneously transmit data or control information on an uplink channel to the base station via at least two independent data stream corresponding to the set of transmission ranks associated with the at least one cluster of the set of clusters.

20. The apparatus of claim 19, wherein the data or control information is transmitted on the uplink channel via an uplink beam pair configured between the UE and the base station based on at least one of beam reciprocity associated with a downlink beam pair configured between the UE and the base station or autonomous uplink beam training by the UE.

21. The apparatus of claim 14, wherein the at least one processor is further configured to:
transmit, to the base station, information indicating a capability associated with the UE,
wherein the at least one data stream is communicated based on the information indicating the capability associated with the UE.

22. The apparatus of claim 21, wherein the information indicating the capability associated with the UE indicates at least one of:
the number of RF chains associated with each antenna module of the UE that is available to support independent data streams, or
the number of RF chains associated with all antenna modules of the UE.

23. The apparatus of claim 14, wherein the set of angular spread values associated with the set of clusters is determined based on at least one of:
a respective signal strength associated with each of the set of beamformed signals received from the base station, or
a time-domain correlation of a delay spread associated with the set of beamformed signals.

24. The apparatus of claim 23, wherein the respective signal strength comprises at least one of:
a reference signal strength indicator (RSSI),
a reference signal received power (RSRP),
a reference signal received quality (RSRQ),
a signal-to-interference-and-noise ratio (SINR), or
a signal-to-noise ratio (SNR).

25. The apparatus of claim 14, wherein the set of angular spread values associated with the set of clusters is determined further based on a beam steering direction and a beam width associated with a beam via which at least one of the set of beamformed signals is received.

26. A method of wireless communication by a base station, the method comprising:
determining a set of angular spread values associated with a set of clusters in a channel between the base station and a user equipment (UE), a respective angular spread value of the set of angular spread values being associated with each cluster of the set of clusters;
determining a set of transmission ranks associated with at least one cluster of the set of clusters based on the set of angular spread values and based on a number of radio frequency (RF) chains at the UE;
transmitting the set of transmission ranks associated with the at least one cluster of the set of clusters to the UE; and
communicating at least one data stream with the UE across the at least one cluster using the set of transmission ranks associated with the at least one cluster of the set of clusters.

27. The method of claim 26, further comprising:
transmitting a set of beamformed signals to the UE; and
receiving, from the UE, information indicating the set of angular spread values based on the set of beamformed signals,
wherein the set of angular spread values is determined based on the information indicating the set of angular spread values received from the UE.

28. The method of claim 26, further comprising:
receiving a set of beamformed signals from the UE,
wherein the set of angular spread values is determined based on the set of beamformed signals received from the UE.

29. A method of wireless communication by a user equipment (UE), the method comprising:
receiving a set of beamformed signals from a base station;
determining a set of angular spread values associated with a set of clusters in a channel between the base station and the UE based on the set of beamformed signals received from the base station, a respective angular spread value of the set of angular spread values being associated with each cluster of the set of clusters;
transmitting the set of angular spread values to the base station;
receiving, from the base station based on the set of angular spread values and based on a number of radio frequency (RF) chains at the UE, a set of transmission ranks associated with at least one cluster of the set of clusters; and
communicating at least one data stream with the base station across the at least one cluster using the set of transmission ranks associated with the at least one cluster of the set of clusters.

30. The method of claim 29, further comprising:
transmitting, to the base station, information indicating a status associated with the UE,
wherein the set of transmission ranks is received further based on the information indicating the status associated with the UE.

* * * * *